(12) United States Patent
Vermette et al.

(10) Patent No.: US 11,466,879 B2
(45) Date of Patent: *Oct. 11, 2022

(54) SYSTEM AND METHOD FOR INTEGRATED CONTROL OF SUPPLY FAN

(71) Applicant: BROAN-NUTONE LLC, Hartford, WI (US)

(72) Inventors: Danic Vermette, St-Cyrille de Wendover (CA); Simon Blanchard, Drummondville (CA); Stephane Michaud, Drummondville (CA); Michel Julien, Drummondville (CA); Dominic Blanchette, Drummondville (CA)

(73) Assignee: Broan-NuTone LLC, Hartford, WI (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/959,567

(22) PCT Filed: Jan. 8, 2019

(86) PCT No.: PCT/US2019/012794
§ 371 (c)(1),
(2) Date: Jul. 1, 2020

(87) PCT Pub. No.: WO2019/136489
PCT Pub. Date: Jul. 11, 2019

(65) Prior Publication Data
US 2020/0386429 A1 Dec. 10, 2020

Related U.S. Application Data

(60) Provisional application No. 62/614,840, filed on Jan. 8, 2018, provisional application No. 62/614,848, filed on Jan. 8, 2018.

(51) Int. Cl.
*F24F 11/30* (2018.01)
*F24F 13/14* (2006.01)
(Continued)

(52) U.S. Cl.
CPC .......... *F24F 11/0001* (2013.01); *F24F 11/30* (2018.01); *F24F 11/54* (2018.01);
(Continued)

(58) Field of Classification Search
CPC ........ F24F 11/0001; F24F 11/30; F24F 11/54; F24F 11/58; F24F 11/64; F24F 11/65;
(Continued)

(56) References Cited

U.S. PATENT DOCUMENTS 6,328,647 B1 12/2001 Traudt
8,374,725 B1 2/2013 Ols
(Continued)

FOREIGN PATENT DOCUMENTS

| CN | 107914858 A | 4/2018 |
|---|---|---|
| FR | 2935467 | 3/2010 |
| WO | WO0220136 A1 | 3/2002 |

OTHER PUBLICATIONS

Final Office Action issued to U.S. Appl. No. 16/242,498, dated Jul. 14, 2021 (44 pages).
(Continued)

*Primary Examiner* — Kidest Bahta
(74) *Attorney, Agent, or Firm* — Barnes & Thornburg LLP

(57) ABSTRACT

The present disclosure describes a supply fan assembly including a controller, a memory operably coupled with the controller. The supply fan assembly further includes at least one environment sensor operably coupled with the controller and a fan supplying fresh air from an exterior environment into a structure according to instructions from the controller.

(Continued)

Additionally, the operational data is generated by the at least one of the environment sensor and the controller, and the controller instructs the fan in response to the operational data generated during a pre-defined time period.

19 Claims, 19 Drawing Sheets

(51) Int. Cl.

| | | |
|---|---|---|
| *F24F 11/00* | (2018.01) | |
| *G05B 19/042* | (2006.01) | |
| *F24F 11/64* | (2018.01) | |
| *F24F 11/65* | (2018.01) | |
| *F24F 11/54* | (2018.01) | |
| *F24F 11/58* | (2018.01) | |
| *F24F 110/10* | (2018.01) | |
| *F24F 140/40* | (2018.01) | |
| *F24F 110/20* | (2018.01) | |
| *F24F 110/22* | (2018.01) | |
| *F24F 130/10* | (2018.01) | |
| *F24F 110/12* | (2018.01) | |
| *F24F 140/30* | (2018.01) | |

(52) U.S. Cl.
CPC .............. *F24F 11/58* (2018.01); *F24F 11/64* (2018.01); *F24F 11/65* (2018.01); *F24F 13/14* (2013.01); *F24F 13/1426* (2013.01); *G05B 19/042* (2013.01); *G05B 19/0426* (2013.01); *F24F 2011/0002* (2013.01); *F24F 2013/1433* (2013.01); *F24F 2110/10* (2018.01); *F24F 2110/12* (2018.01); *F24F 2110/20* (2018.01); *F24F 2110/22* (2018.01); *F24F 2130/10* (2018.01); *F24F 2140/30* (2018.01); *F24F 2140/40* (2018.01); *G05B 2219/2614* (2013.01)

(58) Field of Classification Search
CPC ................... F24F 13/14; F24F 13/1426; F24F 2011/0002; F24F 2013/1433; F24F 2110/10; F24F 2140/40; F24F 2110/12; F24F 2110/20; F24F 2110/22; F24F 2130/10; F24F 2140/30; G05B 19/042; G05B 19/0426; G05B 2219/26
See application file for complete search history.

(56) References Cited

U.S. PATENT DOCUMENTS

| | | | |
|---|---|---|---|
| 9,312,801 | B2 | 4/2016 | Randall et al. |
| 10,309,663 | B1 | 6/2019 | Taber et al. |
| 10,580,094 | B1 | 3/2020 | Haynold |
| 10,830,464 | B1 | 11/2020 | Stevenson |
| 2005/0234596 | A1 | 10/2005 | Rietschel |
| 2006/0176186 | A1* | 8/2006 | Larson .................... H02H 7/08 |
| | | | 324/177 |
| 2010/0211224 | A1 | 8/2010 | Keeling et al. |
| 2010/0263830 | A1 | 10/2010 | Noteboom et al. |
| 2011/0036108 | A1* | 2/2011 | Seem ..................... F24F 11/30 |
| | | | 62/89 |
| 2012/0016526 | A1* | 1/2012 | Burton ................... F24F 11/80 |
| | | | 700/278 |
| 2012/0232969 | A1 | 9/2012 | Fadell et al. |
| 2014/0222241 | A1 | 8/2014 | Ols |
| 2015/0090803 | A1 | 4/2015 | Okamoto et al. |
| 2017/0130983 | A1 | 5/2017 | Vermette et al. |
| 2017/0277759 | A1 | 9/2017 | Boehme et al. |
| 2017/0361259 | A1 | 12/2017 | Fox et al. |
| 2018/0023826 | A1 | 1/2018 | Tucker et al. |
| 2019/0202380 | A1 | 7/2019 | Schumacher et al. |

OTHER PUBLICATIONS

Notice of Allowance issued to U.S. Appl. No. 16/243,056, dated Aug. 27, 2021 (87 pages).
Search Report & Written Opinion issued in Int'l Appl. No. PCT/US2019/012794 (2019).

\* cited by examiner

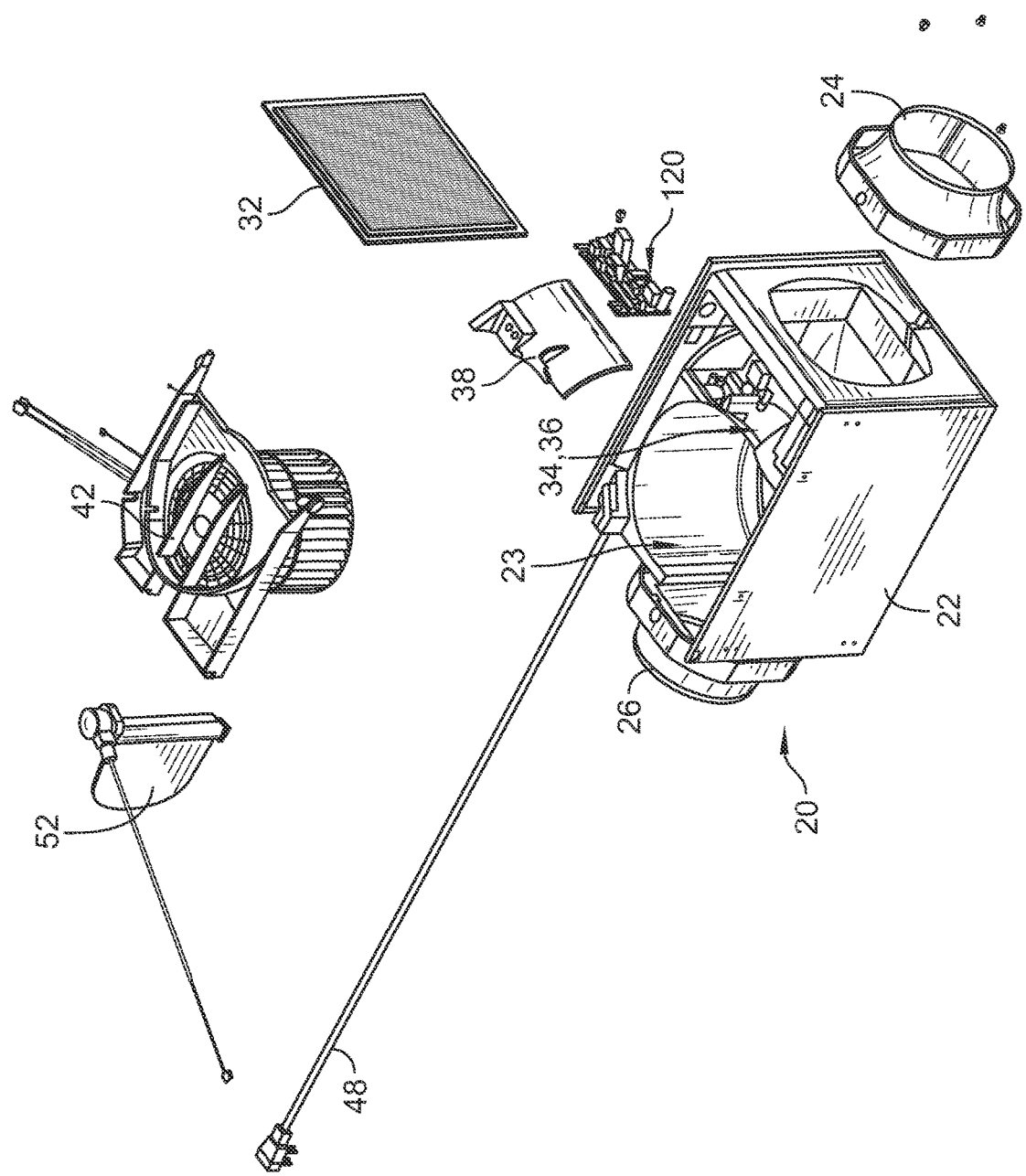

THE PREDICTION TABLE IS BUILT USING EXTERNAL CONDITIONS MEASURED BY THE RH&T SENSOR EVERY HOUR AND THE AHU COOLING (Y) AND HEATING (W) CALLS DURATION.

PREDICTION TABLE

| HOUR | DP2 | DP1 | T2 | T1 | Y2 | Y1 | W2 | W1 | VALID |
|------|-----|-----|----|----|----|----|----|----|-------|
| 0    |     |     |    |    |    |    |    |    |       |
| 1    |     |     |    |    |    |    |    |    |       |
| ...  | ... | ... | ...| ...| ...| ...| ...| ...| ...   |
| 22   |     |     |    |    |    |    |    |    |       |
| 23   |     |     |    |    |    |    |    |    |       |

DP2-1 = DEW POINT MEASURED 48 HOURS AGO (2) AND 24 HOURS AGO (1)
T2-1 = TEMPERATURE MEASURED 48 HOURS AGO (2) AND 24 HOURS AGO (1)
Y2-1 = DURATION OF THE COOLING CALLS WITHIN THE HOUR 48 HOURS AGO (2) AND 24 HOURS AGO (1)
W2-1 = DURATION OF THE HEATING CALLS WITHIN THE HOUR 48 HOURS AGO (2) AND 24 HOURS AGO (1)

FIG. 3C

| Selected Mode | No thermostat Call L-106 | | | | Thermostat Heating Call R-108 | | Thermostat Cooling Call | |
|---|---|---|---|---|---|---|---|---|
| | Lower limits | | Upper limits | | Lower limits | | Upper limits | |
| 102 | T° | Dew point | T° | Dew point | T° | Dew point | T° | Dew point |
| 1 - Ashrae 2016 | 40 | Code complaint -no limits | | | 40 | Code Complaint -no limits | | |
| 2 - Ashrae 2010 (factory setting) | 40 | | | | 40 | | | |
| 3 - IRC / IMC 2012-2015 | 40 | | | | 40 | | | |
| A - Comfort mode Hot / Humid #1 | 50 | 40 | 90 | 75 | 40 | 40 | 98 | 80 |
| B - Comfort mode Hot / Humid #2 | 50 | 40 | 97 | 80 | 40 | 40 | 103 | 85 |
| C - Comfort mode Hot / Dry | 50 | 40 | 97 | 75 | 40 | 40 | 103 | 85 |
| D - Comfort mode Mixed / Humid | 50 | 40 | 90 | 75 | 40 | 40 | 95 | 80 |
| E - Comfort mode Mixed / Dry | 50 | 40 | 90 | 75 | 40 | 40 | 95 | 80 |

*FIG. 4A*

| SPEED SETTING | REQUIRED CFM | | | | | | | | | | | | | | |
|---|---|---|---|---|---|---|---|---|---|---|---|---|---|---|---|
| | 30 | 35 | 40 | 45 | 50 | 55 | 60 | 65 | 70 | 75 | 80 | 85 | 90 | 95 | 100 | 105 |
| 130 CFM | 25 | 30 | 30 | 35 | 40 | 40 | 45 | 50 | 55 | 60 | 60 | 65 | 70 | 75 | 80 | 80 |
| 180 CFM | 20 | 20 | 20 | 25 | 30 | 30 | 35 | 35 | 40 | 40 | 45 | 50 | 50 | 55 | 55 | 60 |

| SPEED SETTING | REQUIRED CFM | | | | | | | | | | | | | | |
|---|---|---|---|---|---|---|---|---|---|---|---|---|---|---|---|
| | 110 | 115 | 120 | 125 | 130 | 135 | 140 | 145 | 150 | 155 | 160 | 165 | 170 | 175 | 180 |
| 130 CFM | 85 | 90 | 90 | 95 | 100 | - | - | - | - | - | - | - | - | - | - |
| 180 CFM | 60 | 65 | 70 | 70 | 70 | 75 | 80 | 80 | 85 | 85 | 70 | 90 | 95 | 95 | 100 |

GRAYED OUT VALUES ARE THE RECOMMENDED SETTINGS AND SHOULD BE PREFERRED.

*FIG. 4B*

LIMITS TABLE — 100d

| SELECTED MODE | NO CALL | | | | HEATING OR COOLING CALL | | | | CYCLE TIME LIMITS | DECISION TRIGGER |
|---|---|---|---|---|---|---|---|---|---|---|
| | LOWER LIMIT | | HIGHER LIMIT | | LOWER LIMIT | | HIGHER LIMIT | | | |
| | TEMP | DEW POINT | TEMP | DEW POINT | TEMP | DEW POINT | TEMP | DEW POINT | | |
| ASHRAE 2016 | 40 | NO LIMITS TO MEET CODE | | | NO LIMITS TO MEET CODE | | | | 3H | DP |
| ASHRAE 2010 | 40 | | | | | | | | 4H | DP |
| IRC / IMC 2012-2015 | 40 | | | | | | | | 4H | DP |
| COMFORT MODE: HOT / HUMID #1 | 50 | 40 | 90 | 75 | 40 | 98 | 80 | | 4H | DP |
| COMFORT MODE: HOT / HUMID #2 | 50 | 40 | 97 | 80 | 40 | 103 | 85 | | 4H | DP |
| COMFORT MODE: HOT / DRY | 50 | 40 | 97 | 75 | 40 | 103 | 85 | | 4H | T |
| COMFORT MODE: TEMPERED / HUMID | 50 | 40 | 90 | 75 | 40 | 95 | 80 | | 4H | DP |
| COMFORT MODE: TEMPERED / DRY | 50 | 40 | 90 | 75 | 40 | 95 | 80 | | 4H | T |

*FIG. 4D*

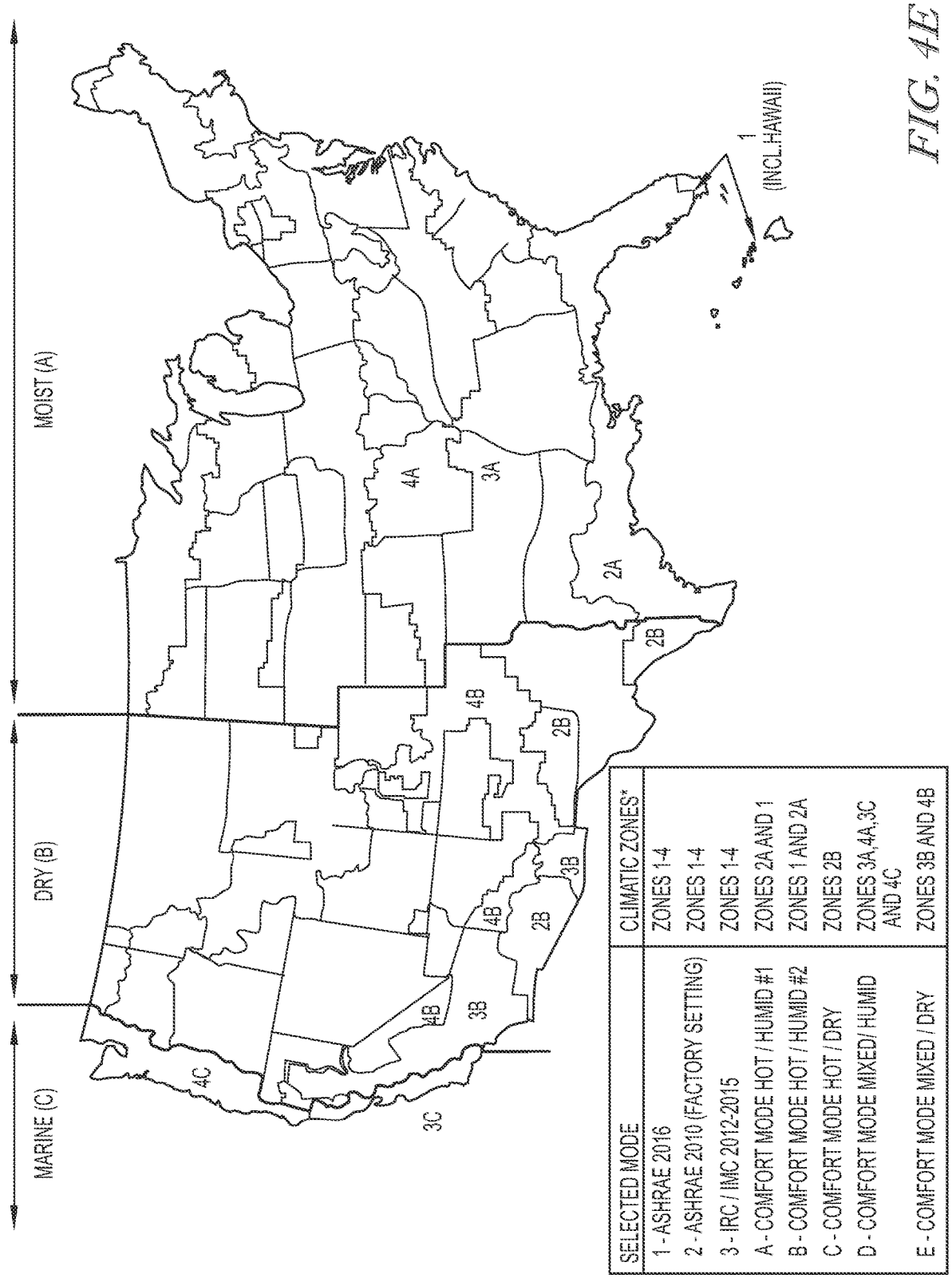

SYSTEM AND METHOD FOR INTEGRATED CONTROL OF SUPPLY FAN

CROSS REFERENCE TO RELATED APPLICATIONS

The present application claims the benefit of U.S. provisional patent application No. 62/614,848, filed on Jan. 8, 2018; and U.S. provisional patent application No. 62/614,840, filed on Jan. 8, 2018, the entire disclosure thereof being hereby incorporated by reference herein.

TECHNICAL FIELD

The present disclosure relates generally to a system and method for integrated operation and control of an air ventilation unit. More particularly, the subject matter disclosed herein relates to a system with integrated control components for operation of supply fan units and methods of controlling supply fan units during operation within buildings.

BACKGROUND

In warm and/or humid climates, such as those found in much of the United States and Central America, challenges exist for air distribution systems. Conventional outside air distribution systems for home ventilation include ducting connected between a port to outside air (i.e., inlet port) and a supply fan unit and further connected to an air handler unit (AHU). A motorized damper is positioned within the ducting and may be energized and driven by a controller for a period of time to control a quantity of outside air supplied to the AHU. The quantity of outside air supplied into the AHU may be regulated to comply with applicable standards/codes, such as the American Society of Heating, Refrigeration, and Air Conditioning Engineers (ASHRAE) ventilation requirements and/or applicable building code ventilation requirements. Often times, a conventional system is referred to as an "Air Cycler", "Air Exchanger", or "Central Fan Integrated System" (CFIS). Some models of CFIS are connected to a humidity sensor, located either outside or inside of a home or other building, and/or a temperature sensor located outside of the home. The use of humidity sensor(s) and temperature sensor(s) typically require wiring between the controller and the sensors.

If a humidity sensor is located in the home, the controller of the typical CFIS, or a supply fan unit thereof, prevents ventilation when the inside humidity level (i.e., within the home) is undesirably high. Further, such a CFIS may prevent or stop ventilation when the outside humidity level is lower than the inside humidity level, thereby limiting the ventilation of the serviced home. Limiting ventilation may increase the risk of and/or quantity of pollutants being retained within the home being serviced. Alternatively, when a humidity sensor is located outside of the home, wired and/or wireless communications connect the humidity sensor with the controller. Wireless communications may require batteries to energize the humidity sensor. This may represent increased installation and maintenance costs as well as decreased robustness of communication.

Examples of CFIS, or the supply fan that draws air into the CFIS, use a humidity limit that is configured manually every season in order to avoid condensation in ducting of the associated AHU. Most of the time, these manual configurations are preset limits that account for worst-case scenarios. Determining humidity limits based on worst-case conditions may lead to significantly reduced ventilation time during hot/humid seasons. As previously noted, reduced ventilation time may result in increased pollutant retention within the serviced home/building. Finally, the locations of the temperature sensor(s) for CFISs, air supply fans, or air exchangers must be carefully chosen to prevent outside conditions from influencing and/or altering the readings of the temperature sensor(s). Temperature sensor(s) limit and/or reduce ventilation if the accuracy of one or more temperature sensor(s) is compromised by placement and/or outside temperatures that are unusually cold or hot. In view of these challenges a CFIS, a supply fan unit, air cycler system, and/or outside air distribution system with improved control systems and methods of operation represent an improvement over conventional systems and components.

The description provided in the background section should not be assumed to be prior art merely because it is mentioned in or associated with the background section. The background section may include information that describes one or more aspects of the subject technology.

SUMMARY

According to an aspect of this disclosure, the invention provides a system with integrated control components for operation of supply fan units and methods of controlling a supply fan unit during its operation within a building structure, such as a home. A supply fan unit includes a motorized damper that operates when the supply fan unit is operational. The motorized damper is fluidly connected and/or directly installed within the return side of the AHU. As such, the damper fluidly connects external, fresh air to the AHU thereby bringing fresh air from the exterior environment into the serviced structure, such as a home or building structure.

Further, the present disclosure describes a supply fan assembly including a controller, a memory operably coupled with the controller and having operational data stored on the memory. The supply fan assembly further includes at least one environment sensor operably coupled with the controller and a fan supplying fresh air from an exterior environment into a structure according to instructions from the controller. Additionally, the operational data is generated by the at least one of the environment sensor and the controller, and the controller instructs the fan in response to the operational data generated during a pre-defined time period.

According to the present disclosure, a ventilation system includes a controller, a memory or memory module operably coupled with the controller and configured to store a configuration table and a prediction table, and at least one sensor operably coupled with the controller. Also, the ventilation system includes a ventilation fan that supplies ambient air from an exterior environment to the ventilation system according to operating state instructions generated by the controller in response to the configuration table and the prediction table wherein the operating state instructions of the ventilation fan are based upon both a timing of ventilation parameter and a rate of ventilation parameter.

Further, in this disclosure, a method of controlling inflow of fresh air during an operation period of a ventilation fan includes the follow steps: collecting air values indicative of fresh air characteristics; storing the air values collected over a predetermined time period; controlling the inflow of fresh air during a ventilation cycle in response to the stored sensor signals; and operating a ventilation fan to draw fresh air into ducting for a ventilation period. According to this method, the ventilation period is a part of the ventilation cycle, and the predetermined time period is greater than the ventilation cycle.

In an exemplary embodiment, the supply fan unit uses external sensors located outside the home and in communication with the supply fan unit. Such external sensors measure the conditions and characteristics of the outside air, including air temperature, air humidity, particle size present in the air, level of $CO_2$, level of CO, and/or other qualities. Further, in example embodiments, the supply fan unit has integrated sensors to measure conditions and characteristics of the interior air. The supply fan unit comprises an air pressure sensor fluidly connected to the AHU by ducting connected to the return ducting of the AHU, thereby detecting whether the AHU is operational. The supply fan unit may further comprise an interlock feature with exhaust fans for activating the supply fans so as to reach balanced ventilation.

A controller receives and processes one or more signals from one or more sensors. The controller uses the one or more sensor signals as inputs to operate the supply fan unit according to building code ventilation requirements and/or other predetermined operational parameters. Accordingly, the controller adjusts operations to manipulate inflow of fresh air as part of the ventilation rate.

The air supply fan unit may be installed and operate in conjunction with an AHU, or in an autonomous mode. In the latter configuration, the air supply fan unit may not be connected to an AHU, but rather operate to provide air to the interior of the building independently from the operation of an AHU. In this embodiment, the air supply fan unit operates in a similar to an air supply fan unit connected to an AHU, as described hereinbelow, but without interacting with sensor signals from the AHU and/or other AHU components (e.g., a wall control unit, thermostat, or another user input unit). The supply fan unit in accordance with this embodiment therefore controls inflow of fresh air in the building in an optimized manner without receiving inputs from an AHU.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 2A is an exploded view of the supply fan unit of FIG. 1;

FIG. 3C is a prediction table for operation of the supply fan unit of FIG. 1, according to an exemplary embodiment;

FIGS. 4A and 4B are configuration tables used for setting operating configurations of the supply fan unit of FIG. 1;

FIG. 4D is an alternate configuration table for setting operating configurations of the supply fan unit and including cycle times and decision triggers;

FIG. 4E is a map of the U.S.A. illustrating by region, in association with a legend, preferred modes of the configuration tables of FIGS. 4A-4D;

Figure 1:
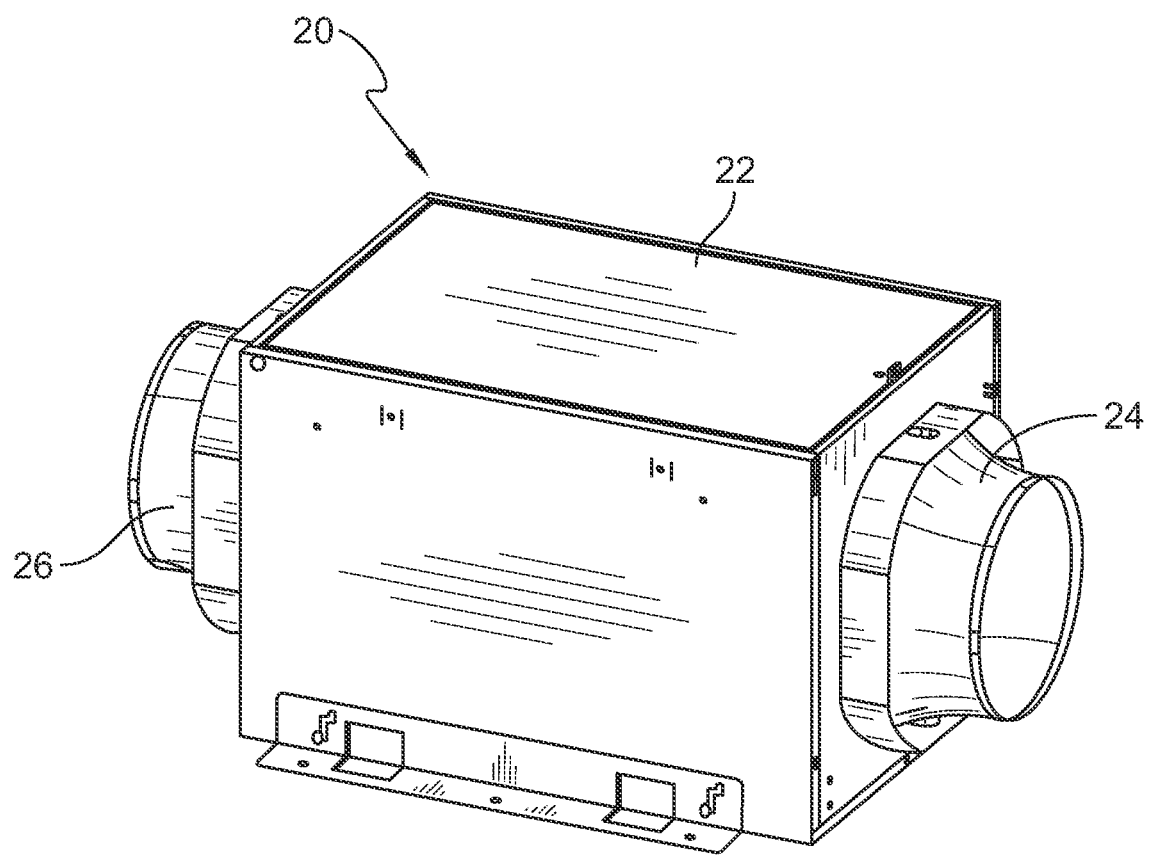
FIG. 1 is a perspective view of a supply fan unit in accordance with an embodiment of the invention.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Detailed below is a system with integrated control components for operation of supply fan units and methods of controlling a supply fan unit during its operation within a building structure, such as a home. The supply fan unit may be a means of providing outside air to a serviced home. The air may be supplied at a flow rate associated with the supply fan. The supply fan unit may be partly operable with, compatible with, and/or integrated into an air cycler system, an outside air distribution system, an air exchanger, and/or any other system designed to controllably allow and/or forcibly generate fresh airflow from the exterior environment of a building structure into the interior environment of the building structure. Further, a control system described herein may be applied to the ventilation and HVAC systems listed above alternatively and/or in addition to the supply fan unit.

An air handler unit (AHU) may be a device servicing the building structure in at least one of heating, cooling/air conditioning, heat recovery, energy recovery, and/or air circulating/ventilating the building structure. The AHU may alternatively or additionally service the building structure with dehumidifying, humidifying, and/or air filtering functions.

The terms "building," "house," "home," and/or "structure" may refer to one or more edifices that may be serviced by an AHU with respect to heating, ventilating, and air conditioning, and by an associated supply fan unit. The expressions "outside air" and "fresh air" may be used interchangeably and refer to air controllably allowed into the air handler unit and/or forcibly taken from the exterior environment. The outside air or fresh air may vary in temperature and/or humidity depending on the conditions of the exterior environment. "Inside air" or "interior air" is the air already present, at a given time, in the serviced home before addition of fresh air. Further, "outside," "ambient," "environment," and "exterior" refer to the broader space within which the building defines an enclosed space, inside, and/or interior that is serviced by the AHU.

Figure 2B:
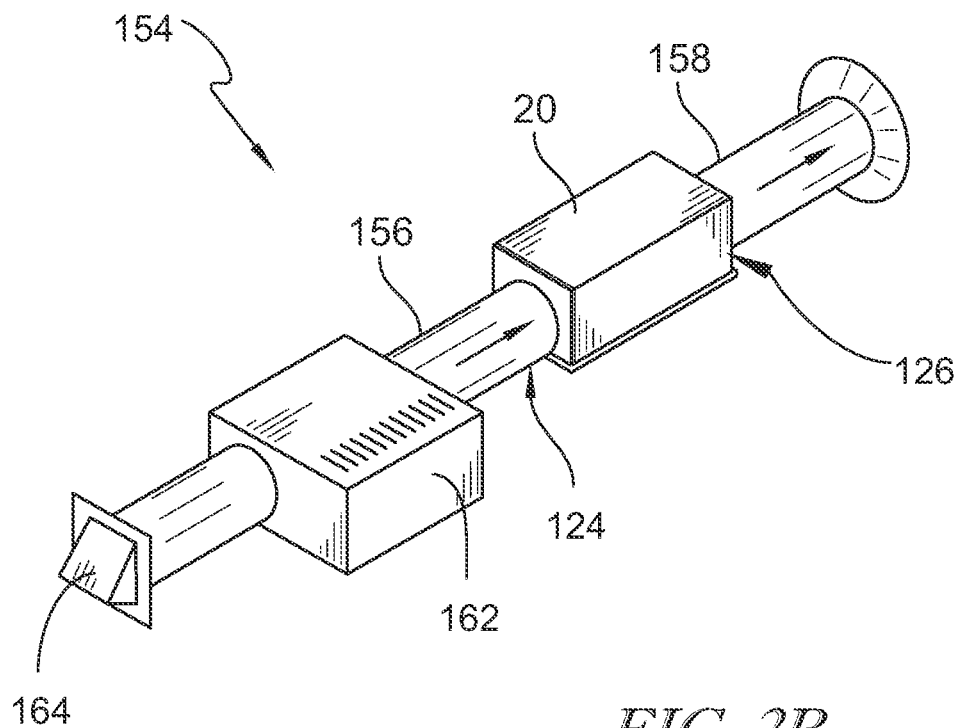
FIG. 2B is an isometric view of a heating, ventilation, and air conditioning system with the supply fan unit installed between an arrangement of ducts.
Figure 2C:
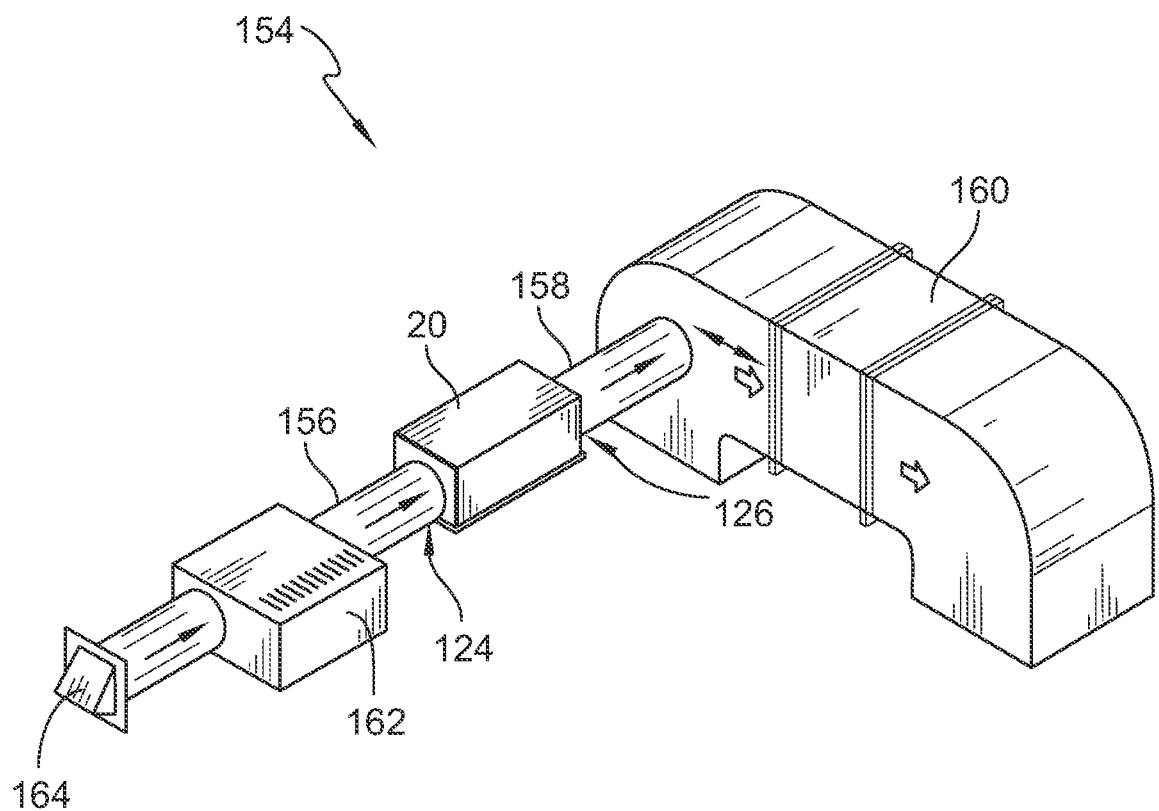
FIG. 2C is an isometric view of the supply fan unit coupled with an air handling unit and installed within a system of ducts.

Referring now to FIGS. 1 and 2, a supply fan unit 20 comprises a housing 22, an inlet port 24, and an outlet port 26. The supply fan unit 20 may be installed in the building with the inlet port 24 connected to an outside ducting in fluid connection with the exterior environment. In accordance with this configuration, the supply fan unit 20 is capable of drawing fresh air into the building interior. The outlet port 26 is connected to an inside ducting that may be fluidly connected with another component, such as an AHU 160 (see FIG. 2C). The outlet port 26 controllably supplies the AHU 160 with fresh air. The housing 22 defines an enclosed environment or internal cavity within the supply fan unit 20 thereby preventing outside air from uncontrollably flowing into the internal cavity 23 within which the air supply unit 20 is installed. The closed environment within the housing 22 also prevents unfresh air of the building interior (e.g., the attic of the building) from mixing with fresh, incoming air from the exterior environment.

The air supply unit 20 defines an interior airflow passageway from the inlet port 24 through a filter 132 and into the internal cavity 23 to the outlet port 26, as depicted in FIG. 2A. Further along the airflow passageway, the fresh air encounters integrated sensors or environment sensors such as a temperature sensor 34 and a humidity sensor 36. According to exemplary embodiments, one or more other suitable integrated and/or external sensors may alternatively or additionally be present within the internal cavity 23 and along the interior airflow path. Next, the fresh air passing along the airflow passageway is propelled by a fan 42 towards the outlet port 26. A controllable damper 52 is manipulated between open, closed, and intermediate positions. The controllable damper 52 traverses the airflow passageway beyond the foregoing components, but before the outlet port 26. The position of the controllable damper 52 and the controllable speed of the fan 42 may manipulate the airflow passageway and the flow rate of fresh air as the airflow is discharged through the outlet port 26 and from the air supply fan unit 20. The airflow may be controllable within a range of relatively no airflow to a maximum airflow rate. Additional information concerning the damper 52 and damper control assemblies may be found in co-pending U.S. patent application Ser. No. 16/242,498, filed Jan. 8, 2019 and titled "DAMPER CONTROL ASSEMBLY & METHOD FOR USE IN AIR FLOW SYSTEM", the entire disclosure of which is hereby incorporated by reference herein.

The air supply unit 20 further comprises a controller 120 for controlling the damper 52 and the fan 42. The integrated sensors 34, 36 are also connected to the controller 120, which resides with an enclosure cover 38. Additional electrical/electronic components, such as one or more printed circuit boards (PCBs) and/or other control circuitry are also housed within the cover 38. The cover 38 may protect the controller 120 and other electrical components from undesirable human contact and/or prevent the accumulation of humidity and rapid temperature variation from affecting the enclosed controller 120 and other enclosed electric/electronic components. Referring still to FIG. 2A, the air supply unit 20 is powered and may be connected to the grid of the building via one or more power leads 48. The power transmitted by the one or more power leads 48 powers the various components (e.g., the controller 120, the fan 42, the damper 52, the temperature sensor 34, humidity sensor 36, and/or other components therein). In an exemplary embodiment, the air supply unit 20 may have a hardwired connection to the electrical grid of the building thereby omitting use of an outlet.

The air supply unit 20 may be powered by a one or more of sources. The fan 42 may powered by the one or more power leads 48 and/or otherwise connected to the power grid of the building. The controller 120 may be powered with, for example, a 24V (volt) power source or the 110V power grid. In an exemplary embodiment, the 24V power source may be provided by a component of the AHU 160 such as, for example, the transformer of the AHU 160. According to another embodiment, the air supply unit 20 comprises a transformer connected to the power grid of the building. The transformer may transform the grid power to provide desired power characteristics. Further, the controller 120 may be powered by a direct current (DC) power source.

Referring now to FIG. 2B, the supply fan unit 20 of FIG. 2A-2C, with the damper control assembly 20 incorporated therein, is shown disposed within an HVAC system 154. Upstream ducts 156 and downstream ducts 158 are coupled to the inlet port 124 and the outlet port 126, respectively, of the supply fan unit 20.

In exemplary embodiments, an in-line heater 162, sized according to airflow and outside design heating temperature from Manual J (a protocol developed by the Air Conditioning Contractors of America (ACCA)) or ASHRAE specifications, may be installed to heat the air delivered to the AHU 160 to an acceptable operating temperature. For example, it may be desirable to maintain a minimum temperature of 55° F. for all air passing through the AHU 160. The in-line heater 162 may have an integrated airflow sensor and a temperature sensor to prevent heating in no-flow or low-flow conditions, during which heating is typically not desirable. The heater 162 is coupled with an air inlet 164 through which fresh air flows to the heater 162. The air passes from the heater 162 through the duct 156 to the supply fan unit 20.

In FIG. 2C, the supply fan unit 20 is coupled by the duct 158 to the air handling unit 160. Accordingly, fresh air is drawn in by the fan 142, through the supply fan unit 20, and through the duct 158 to the AHU 160. From there, the AHU 160 may distribute the air through further ducting or operate in another suitable manner. The present disclosure contemplates the installation of the herein described damper control assembly within other ducting and/or other HVAC systems, including an AHU and/or one or more air outflow fan units.

Figure 3A:
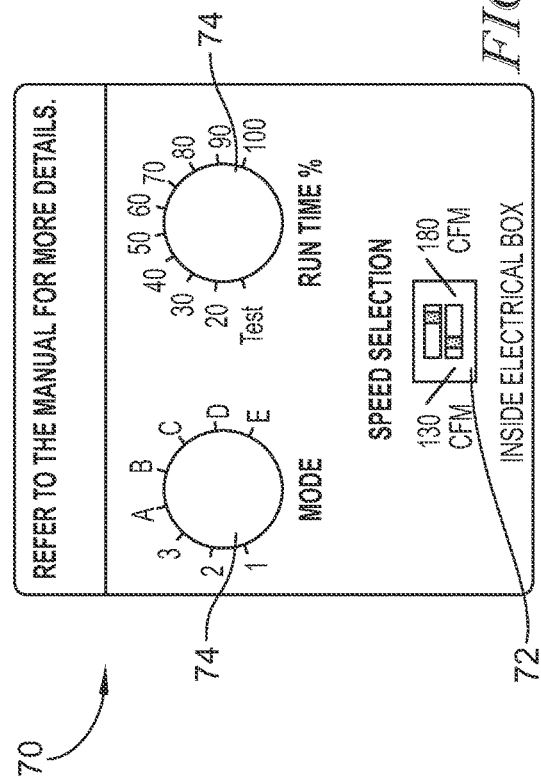
FIG. 3A is a front view of a control interface associated with the supply fan unit of FIG. 1.

Referring now to FIG. 3A, the air supply unit 20 comprises control interface 70 operable by a user to input a selected configuration from among a plurality of possible configurations. The control interface 70 may include integrated switches 72, integrated push-buttons, integrated toggles, and/or integrated button-type controls such as potentiometers 74. In an exemplary embodiment, an external control module may be in communication with the air supply unit 20 and comprise one or more similar controls. The air supply unit 20 comprises a display (not shown) comprising one or more light/LEDs. The behavior of the one or more LEDs (e.g., off, on, flashing, flashing sequence, and duration) may indicate the status of operation of the air supply fan unit 20 including signaling error conditions and servicing conditions.

Figure 3B:
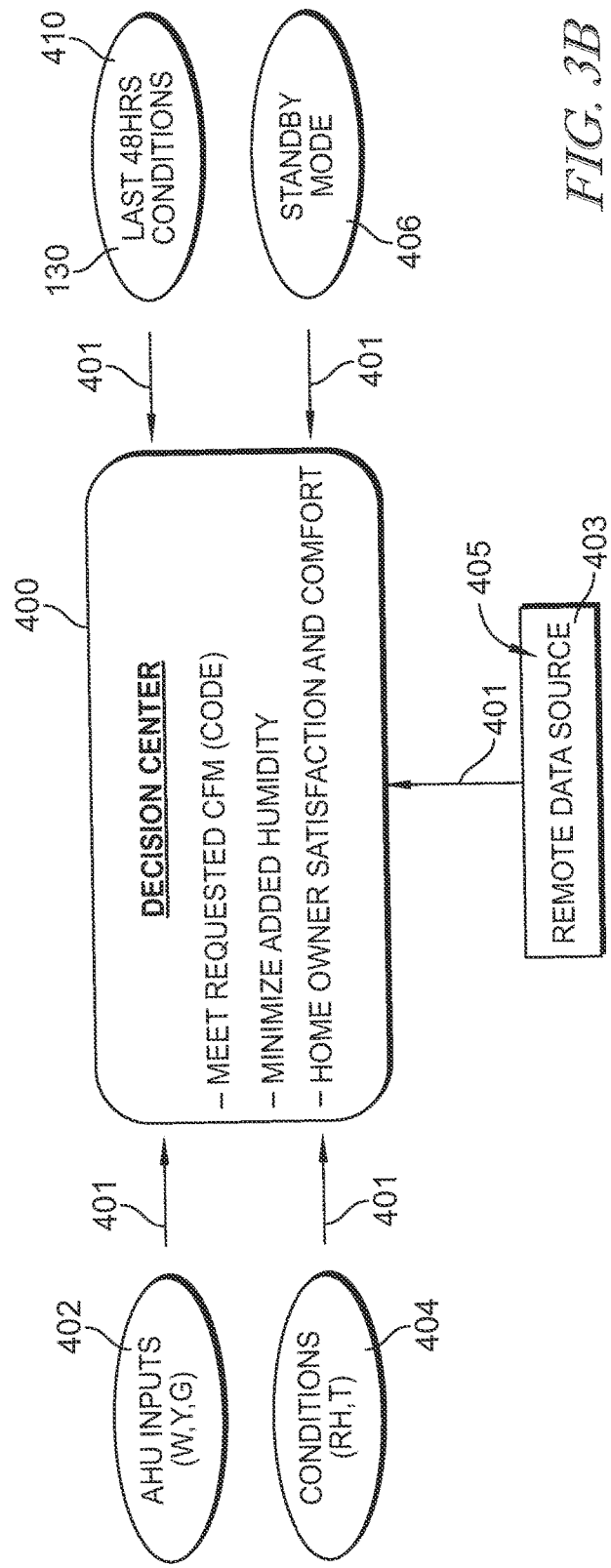
FIG. 3B is a block diagram indicating a set of general operating parameters of the supply fan unit of FIG. 1.

FIG. 3B is a block diagram illustrating inputs to a control system 400 of the supply fan unit 20. The control system 400 may include the controller 120 and one or more programs, processes, and/or algorithms executed by the controller 120 and stored in memory 146 (see FIG. 5), which operate to provide operating state instructions the supply fan unit 20 and/or other components. Inputs to the controller 120 include AHU inputs 402 that supply AHU status information to the control system 400. The AHU inputs 402 may include an operational status (e.g. on/off of the AHU), heating requests (W), cooling requests (Y), thermostat information, and/or user inputs provided through the AHU 160 and/or thermostat. The AHU inputs 402 may correspond to the control interface 70 shown in FIG. 3A.

Sensor inputs 404 include information about the condition of the outside air quality and/or environmental conditions. Specifically, sensor inputs 404 may input readings acquired from the temperature and humidity sensors 34, 36, and/or from other suitable sensors such as are contemplated hereinabove. The control system 400 further receives as an input prediction table data 130 (see FIG. 3C). Still further, the control system 400 may receive a standby mode instruction 406 initiated by a user, the AHU 160, and/or in response to error detection.

Referring now to FIG. 3C, a prediction table 408 is graphically represented and is populated by the prediction table data 130. The prediction table data 130 includes information derived from sensors (e.g. dew point (DP) and temperature (T)) and information regarding the duration and timing of the heating requests (W) and the cooling requests (Y) received by the control system 400 during the previous 48 hours. This information is added to the table according to a timestamp. The prediction table 408 illustrates storage of sensor readings and heating/cooling requests for two days. Accordingly, the prediction table data 130 is stored each hour over the course of a previous time period, such as the past forty-eight hours. Alternatively, the prediction table data 130 may be stored more or less frequently than every hour (e.g. every 15 minutes, every 30 minutes, or every 6 hours), or may be stored according to a different timing pattern that is not uniform (e.g. humidity information may be stored more often during the day). Further, the prediction table data 130 may store more or less than 2 day/48 hours of collected data (e.g. the predication table data may continue historical information for the previous week only the past few hours). Dew point information may be calculated according to known equations and/or retrieved, based on humidity and temperature sensor readings, from prepared dew point tables.

The prediction table data 130 is comprised of one or more historical inputs 410 received by the control system 400. These historical inputs 410 are utilized by the control system 400 to predict the most advantageous time to perform required ventilation (i.e., ventilation necessary to meet with air quality code requirements) for a next operational cycle. Referring once again to FIG. 4A, the control system 400 operates to meet a requested level of ventilation measured in cubic feet per minute (CFM) so as to comply with ventilation codes/industry standards, minimize added humidity, and increase the satisfaction of a homeowner or occupant of the serviced structure.

Taken alone or in any combination, the inputs (e.g. the AHU inputs 402, sensor inputs 404, one or more historical inputs 410) to the control system 400 comprise operational data 401. This disclosure contemplates additional or alternative inputs to the control system 400, or operational data, from one or more remote sources 403 (see FIG. 3B). Remote operational data 405 may include information received from the one or more remote data source 403 including, for example, cloud-stored data, data provided from a weather service or near-real time weather service, and/or data received from networked supply fan units, AHUs, and/or other ventilation systems. Weather forecast information, historical temperature and dew point information collected from local weather stations, and/or air quality index data may supplement or supplant the prediction table data 130. Further, all such information, both gathered from local sources such as the AHU 160 and the sensors 34, 36, may be included with information from remote sources to comprise the operational data 401 and develop the historical data 410 used by the control system 400 to generate the prediction table data 130. In response to the operational data 401, the control system 400 further generates operating state instructions for the supply fan unit 20 and/or other ventilation system components. The controller 120 of the supply fan unit 20 may communicate with the above-noted remote information sources with a communications module 148 (see FIG. 5) integrated within or operably coupled to the controller 120.

The control system 400 is described hereinthroughout as applied to the supply fan unit 20. However, the control system 400 may instead be applied to an air exchanger, air cycler, AHU, CFIS, and/or another suitable ventilation system in order to minimize humidity and/or heat/coolness transferred within a structure.

Still further, the control system 400 contemplated hereby may reside within a controller in a thermostat, other wall control, and/or smart home application. In such case, the control system 400 may make ventilation decisions, and generate operating state instructions for the supply fan unit 20, based on at least a portion of the external inputs and/or historical data 410 (i.e. the operational data 401) discussed hereinabove. Additionally, the control system 400 may generate and/or send operating state instructions to another ventilation system and/or supply fan unit associated with the control system 400 and/or remote therefrom.

FIGS. 4A and 4B illustrate available operating configurations and associated operating conditions of an exemplary embodiment. FIG. 4A presents a configuration table 100a eight (8) available configurations (i.e., settings 1-3 and settings A-E) for control of fresh air inflow operations. Each setting represents operating state conditions associated therewith, and on which the control system 400 executes operational decisions and, in response to which, the controller 400 generates operating state instructions. Configurations 1-3 (102) are building code compliant configurations that determine a fresh air inflow rate parameter (see FIG. 4B). Configurations A-E (104) are custom configurations that determine the fresh air inflow rate based on additional factors. Example additional factors used for custom configurations A-E (104) are outdoor low temperature limit and dew point, outdoor high temperature limit and dew point, and/or other operating condition limits of the AHU 160, such as a request for heating or cooling. Section L (106) of the table shows operation conditions controlling operation independent from a trigger by the thermostat connected to the AHU 160. Section R (108) of the table shows operation conditions controlling operation in the presence of triggers from the thermostat connected to the AHU 160. As depicted, example triggers from the thermostat may include a heating request or a cooling request. FIG. 4B presents another configuration table 100b including therein available setting speeds for the fan 42 in order to set the desired fresh air inflow rate parameter (measured in CFM) for two different example airflow capacities. This air inflow rate of ventilation parameter may be important for determining the duration of a ventilation operating instruction. As a result, the rate of ventilation parameter may be determine in view of the ventilation timing parameter, or vice versa.

Figure 4C:
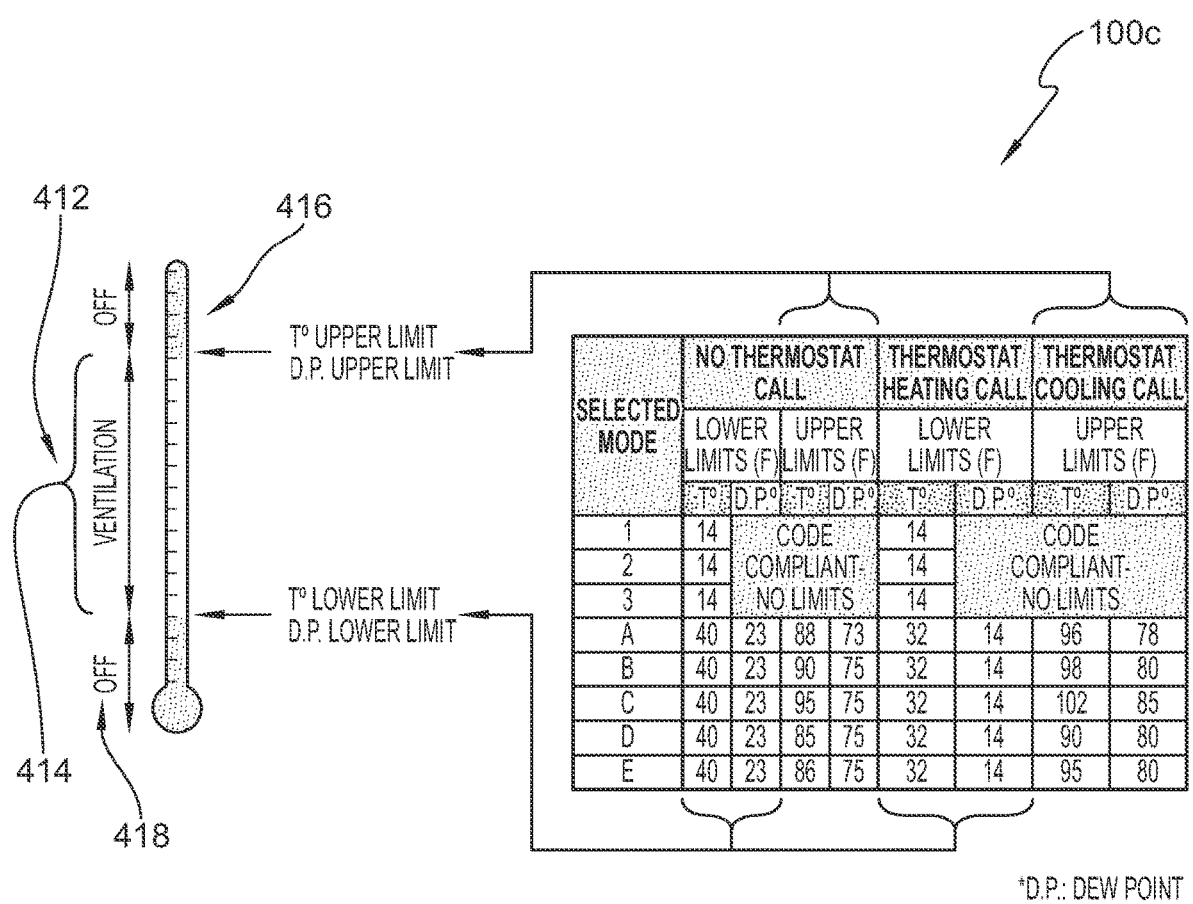
FIG. 4C is an alternate configuration table for setting operating configurations of the supply fan unit and graphically indicating the relationship between the configuration table and a temperature reading.

Referring now to FIG. 4C, another example of a configuration table 100c is shown alongside a graphical representation of limit ranges 412 listed on the configuration table 100c. The limit ranges 412 illustrate a ventilation range 414 between upper and lower temperature/dew point limits or thresholds 416, 418. Within the ventilation range 414, the control system 400 may generate an operating state instruction for the supply fan 20 that conducts ventilation whereby fresh air is drawn in through the supply fan 20. Outside the ventilation range 414 and beyond the upper and lower limits or thresholds 416, 418, the supply fan unit 20 is prevented from conducting ventilation (e.g. entering a ventilation operating state) so as not to draw in fresh air that is undesirably hot, cold, and/or humid. FIG. 4D illustrates still another example configuration table 100d. In FIG. 4D the configuration table 100d, includes ventilation cycle time periods 420 and decision triggers 422. The ventilation cycle time periods 420 and the decision triggers 422 correspond to particular settings of the control interface 70 shown in FIG. 3A. The decision trigger 422 may be temperature or humidity (e.g. dew point) such that when the decision trigger 422 is humidity, the ventilation timing parameter, which determines the timing and duration of ventilation, within the ventilation cycle time period 420 or (OC) (see FIG. 8), is optimized based on historical dew point data. Alternatively, when the decision trigger 422 is temperature, the ventilation timing parameter is optimized based on historical temperature data. In yet another example, a combination of the historical dew point data and historical temperature data may be used to optimize the ventilation timing parameter and/or the ventilation rate parameter, which determines the air inflow rate (see FIG. 4B). The optimization and/or prioritization (during which control of humidity or temperature is optimized) may be executed based on the historical data 410 or the prediction table data 130 generated therefrom. Additionally, within the ventilation cycle time period 420 or operation cycle. Optimization may correspond to limiting, ending, and/or preventing ventilation when a temperature or dew point limit shown in the configuration table 100d is exceeded or not reached. Further, the limit listed for either temperature or humidity in each of the selectable modes defines the ventilation range 414 (see FIG. 4C). Also, the upper and lower limits or thresholds 416, 418, may be modified in response to a heating and/or cooling request received from a thermostat or thermostat control 168 (see FIG. 6).

FIG. 4E is a map graphically illustrating, by region in association with a legend, preferred modes of the configuration tables of FIGS. 4A-4D. Different modes may be more or less suitable for particular climates. It may be desirable to use only certain modes depending on the geographic location of the supply fan unit 20.

Figure 5:
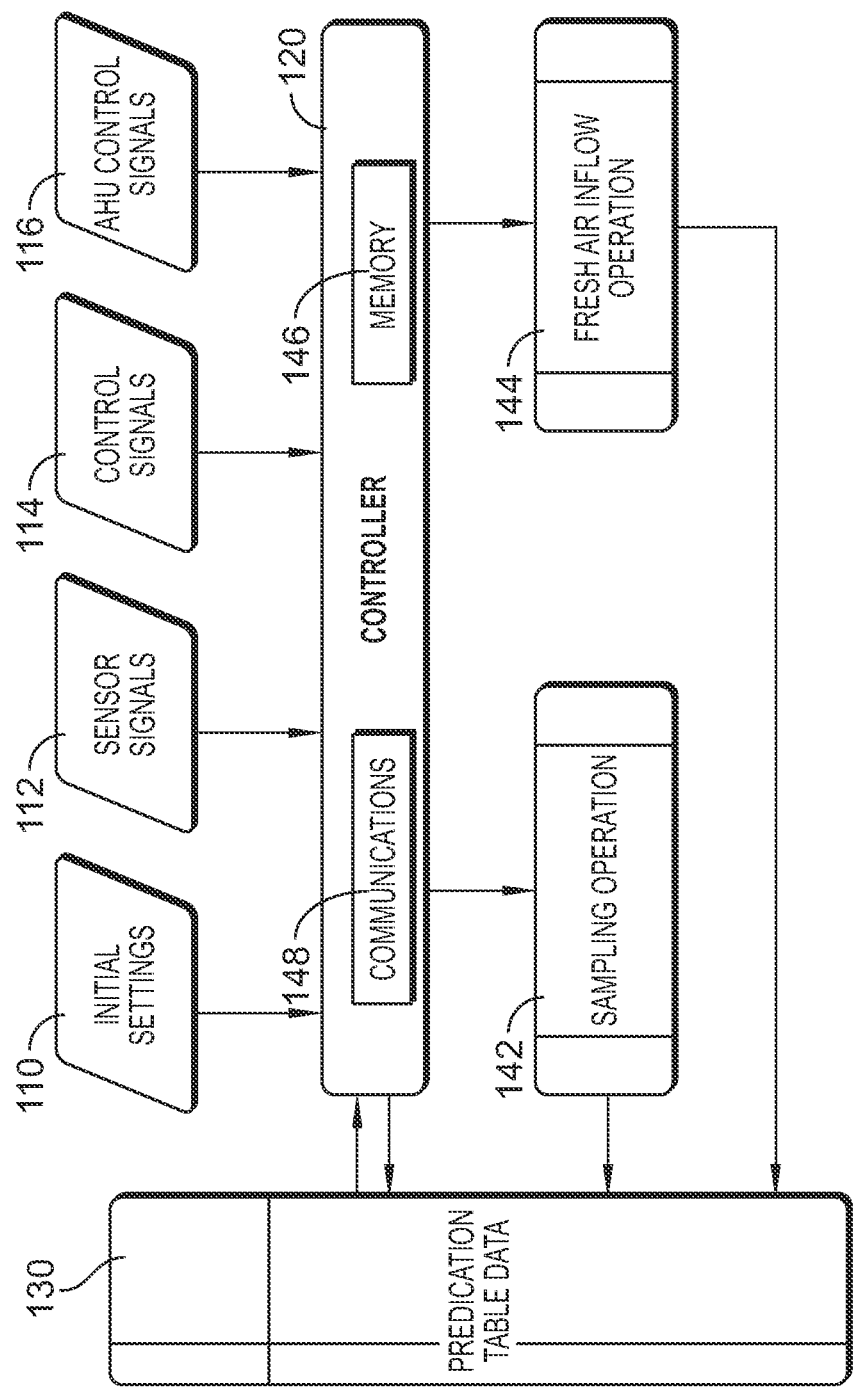
FIG. 5 is a block diagram illustrating components and processes involved in the operation of the supply fan unit.

Referring now to FIG. 5, a schematic diagram illustrates the structure of components participating in the operation of the supply fan unit 20 of the present disclosure. The diagram presents the controller 120, 62 receiving a number of input signals. The input signals include initial settings 110, sensor signals 112, first control signals 114, and second control signals 116. The initial settings 110 control operation in a post-installation mode before collection of data, such as signal inputs, for entry in a normal mode. The sensor signals 112 are received from the temperature sensor 34 and the humidity sensor 36. The control signals 114 are received/input from the control interface 70, and the control signals 116 are collected from the control responsible for triggering operations of the AHU 160 (see wiring schematics of FIG. 7). The controller 120 further operates based on the prediction table data 130. The controller 120 controls two processes: a sampling process 142 (see FIG. 9) and a fresh air supply process 144. The controller 120 is further adapted to feed the prediction table data 130 with new data according to the processes of FIGS. 8 and 9. Programs and algorithms used by the controller 120 are stored in an internal memory/memory module 146 of the controller 120. According to an embodiment, code relative to the programs and algorithms may be stored on a shared non-volatile memory also storing the prediction table data 130. Data and signals illustrated on FIG. 5 are time-varying data and signals. The discussed programs and algorithms may be stored in the memory module 146 within the controller 120 during manufacture and may be updated during maintenance of the supply fan unit 20 performed by a maintenance technician. Additionally, a communications module 148 may be integrated within and/or operably coupled with the controller 120. The communications module 148 may facilitate wired and/or wireless communications with the AHU 160, external sources of data and/or control, and/or with the sensors 34, 36. The communications module 148 operate according to any suitable protocol such as Bluetooth, Wi-Fi, ZigBee, near field communication (NFC), and/or radio-frequency identification (RFID).

Figure 6:
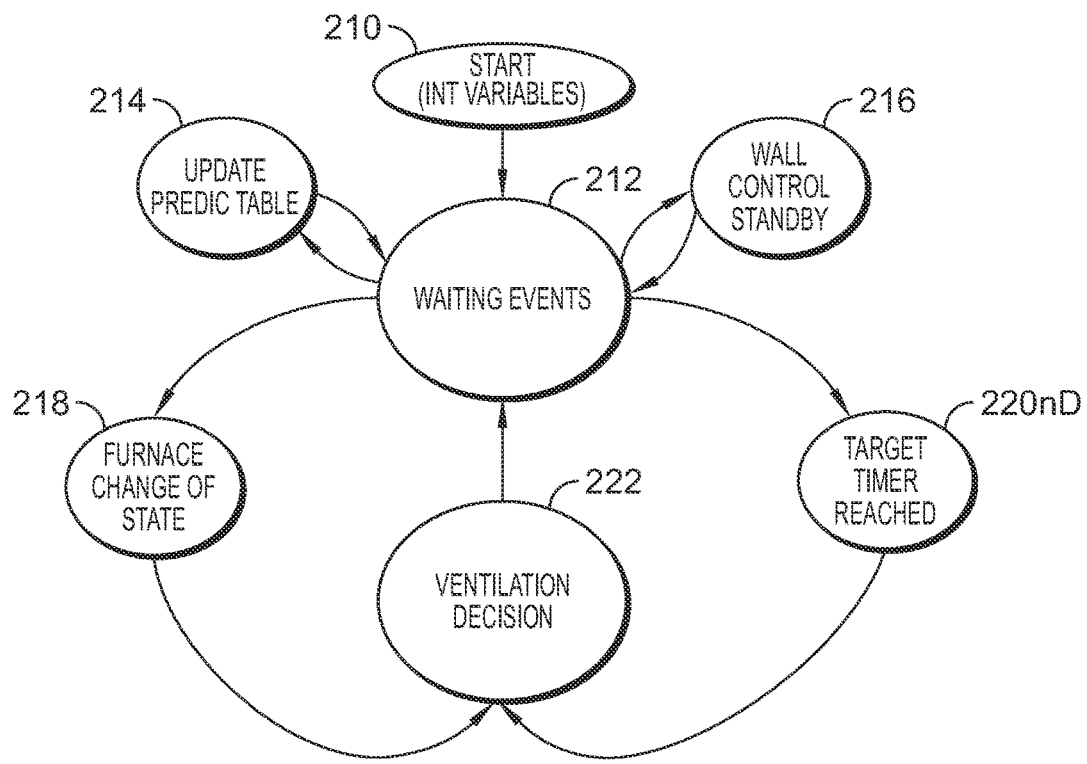
FIG. 6 is a top-level flow chart illustrating operation logics of the supply fan unit.
Figure 7:
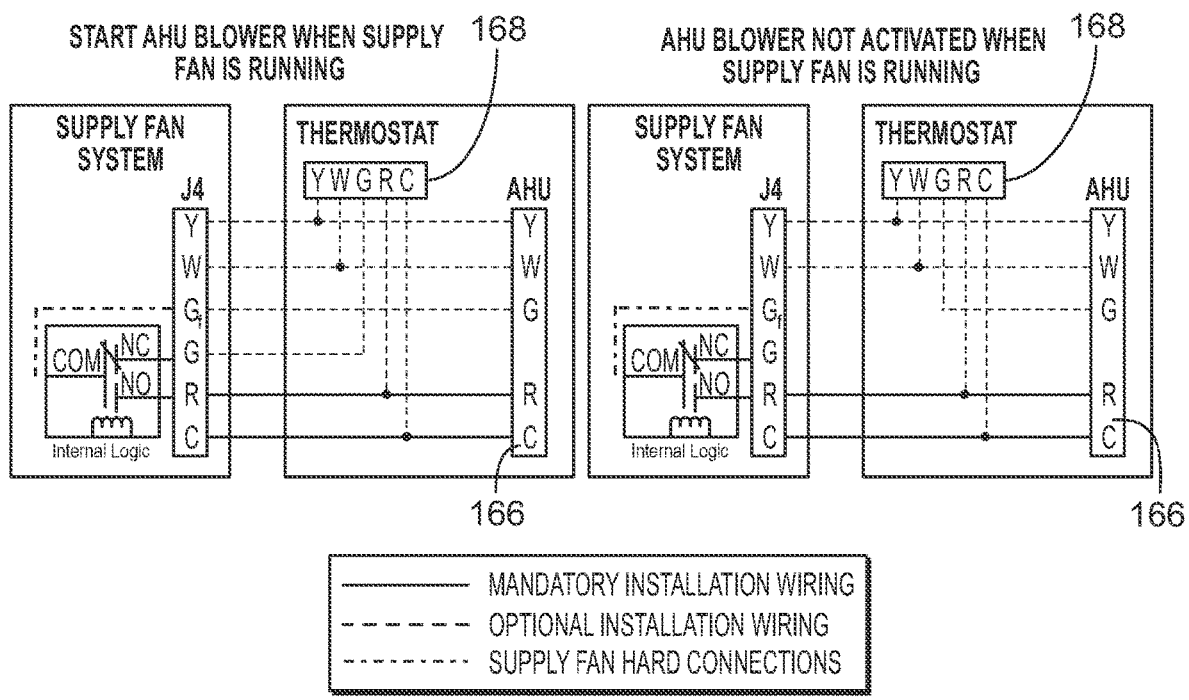
FIG. 7 is a wiring diagram illustrating electrical connections between the supply fan unit of FIGS. 1 and 2, and the AHU with associated control.

FIG. 6 depicts a high-level flow chart of control processes for the air supply fan unit 20. More detailed processes of the controller 120 are shown and described with respect to FIGS. 10-15; however, FIG. 6 represents more general relationships between the control processes for the air supply fan unit 20 and the AHU 160. A starting/initialization process 210 operates the air supply fan unit 20 based on initial settings. A managing and/or waiting events process 212 waits for sensor input and control information. A first data exchange process 214 receives and updates prediction table data based on a current operational state. A second data exchange process 216 receives and/or transmits control signals according to condition changes in the building detected by the wall control. Change of state process 218 is performed by the AHU 160 and provides updates concerning state changes of the AHU 160, which may trigger a determination of a ventilation decision process 222 performed by the supply fan unit 20. If no determination of the ventilation decision process 222 is triggered by an AHU operation, then a time-out algorithm 220 (target timer reached) triggers determination of the ventilation decision process 222 of the supply fan unit 20. Each determination performed by the ventilation decision process 222 is registered by the managing and/or waiting events process 212. In view of the registered determinations of the ventilation decision process 222, the managing/waiting events process 212 manages the operational periods of the supply fan unit 20 to determine a next period of operation. Referring now to FIG. 7, a wiring schematic diagram shows interconnection between the supply fan unit 20, the AHU 160, and the AHU control 166 and/or thermostat control 168. In accordance with this schematic, the signals transmitted by the AHU control 166 to the AHU 160 may trigger heating and/or cooling. These signals may also be registered by the supply fan unit 20, which may tap communications between the thermostat and AHU controls 168, 166 and the AHU 160 to eavesdrop control signals passed therebetween. The control signals tapped by the supply fan unit 20 may be used as inputs to the controller 120.

Figure 8:
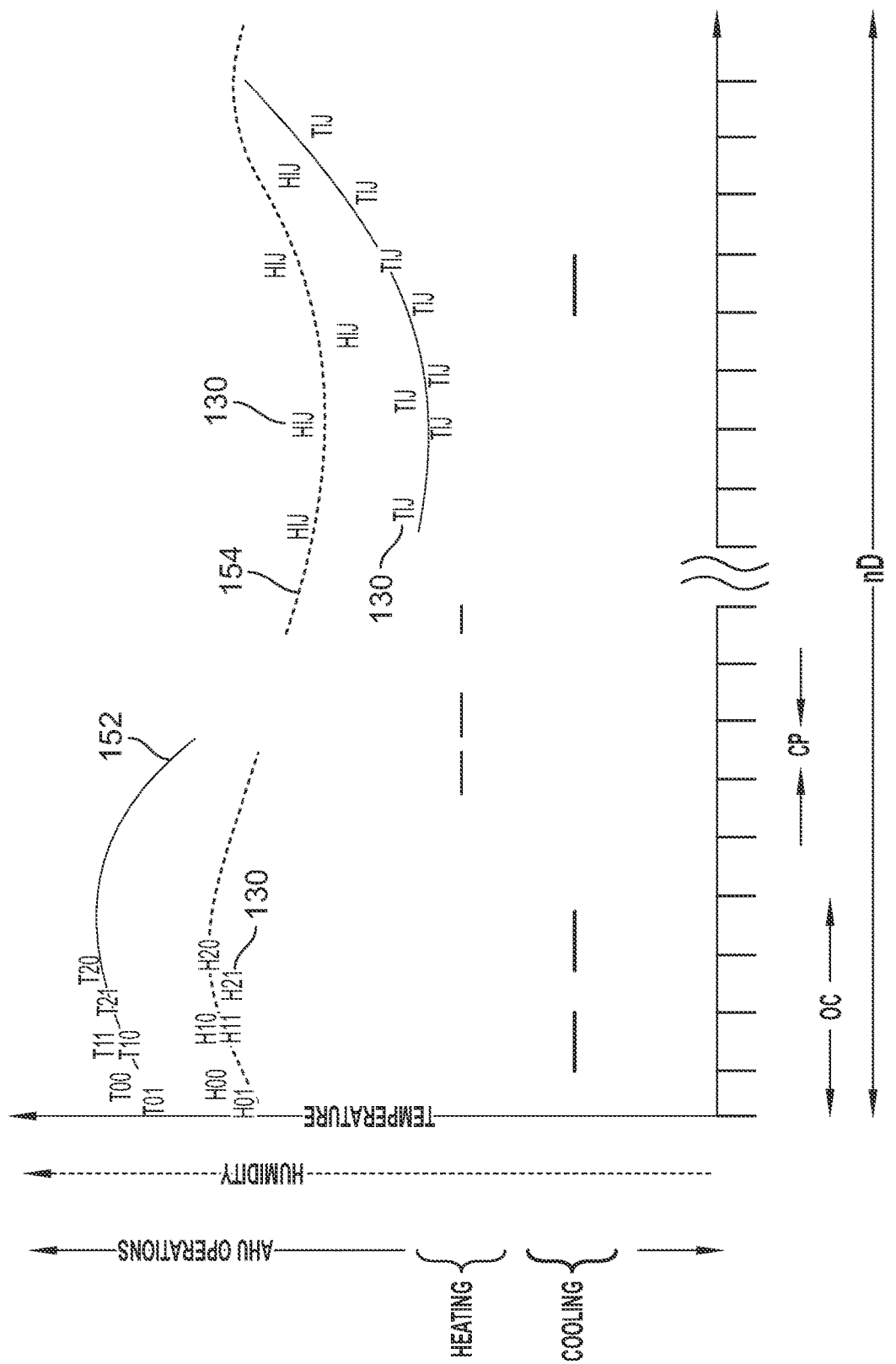
FIG. 8 is a combined chart illustrating fresh air sampling data, AHU heating operation data, AHU heating operation data and prediction curves.

FIG. 8 illustrates an example operation cycle of the supply fan unit 20. The supply fan unit 20 may operate according to a cycle (nD) with "D" referring to a day-long period and "n" the number of day-long periods sampled to develop the prediction table data 130 (FIG. 5). The day-long cycle (D) is further divided in collection period(s) (CP), each collection period typically being one (1) hour in duration. The collection period defines a period during which data collection is performed on fresh air and registered in the prediction table. Data concerning fresh air is collected through a sampling process and/or a fresh air supply process. During each collection period, a sample of fresh air is evaluated to monitor the characteristics of the fresh air over time. Finally, the day-long period is separated into operation cycles (OC) with parameters used in each operation cycle based on the configured settings of the air supply unit 20. The parameters may define limit conditions and fresh air quality/characteristic requirements. The controller 120, based on the algorithm stored in the non-volatile memory 146 readable by the controller 120, determines when to perform a fresh air inflow operation to meet operating and/or limit conditions. Further, for each collection period, a number of sample(s) "n" are collected for each of the temperature sensor 34 (indicated by Tij in FIG. 8) and the humidity sensor 36 (indicated by Hij in FIG. 8). When new data is collected, older data may be pushed from the collection of information for the prediction table 130. For example, data points may be replacement one-for-one in the prediction table 130 with each new data point replacing the oldest present sensor readings. Other example embodiments/algorithms may replace data according to another desired methodology, as applicable. For example, calculations may be performed to identify trends within the data of the prediction table 130 and/or to identify outlier data points. Accordingly, data points discarded as new data points are collected may be adapted according to different goals, as applicable. In exemplary embodiments, the number of data points collected for use in establishing the prediction table 130 may be held constant.

Again referring to FIG. 8, management of the prediction table data is illustrated. In FIG. 8, a collection period identifier (i) ranges from zero (0) to 23, and a sample day identifier (j) ranges from zero (0) to n-1. When new data is collected the sample day identifier (j) of all data of the same temperature (T), humidity (H), and collection period identifier (i). This results in a previously collected sample data point, wherein the sample day identifier (j) is equal to "n", being dropped from the prediction table data 130. This chart corresponds to, but differently represents, the historical temperature and humidity data 410 of the prediction table 408 shown in FIG. 3C. Based on the Tij and Hij present in the prediction table data 130 at any time, first and second prediction curves 152 and 154 are defined for predicting the characteristics of the fresh air. These first and second prediction curves 152, 154 represent temperature prediction and humidity prediction for a normal day cycle (D). Further, this example data set may be managed with relative ease in the non-volatile memory module 146 as a known-size array. A number of algorithms are suitable for obtaining the desired prediction curves based on the value of "n" and the selected length of the collection period. The number (n) and the length of the collection period represent relative values of samples based on an age of the sample or a gap between a sample and another day-long period sample and/or neighboring day-long period samples. Selection of an algorithm may be customizable based on available hardware, sampling conditions, data sensibility, application goals, and/or other suitable. Dependent on application, cost and precision may be appropriately balanced. FIG. 8 shows operation cycles representing a heating mode and cooling mode of the AHU 160. The data collected for heating and cooling modes are continuous data since the supply fan unit 20 taps on the connection between the AHU 160 and the wall control unit therefor. This configuration provides for signal reading/registering at any time.

Figure 9:
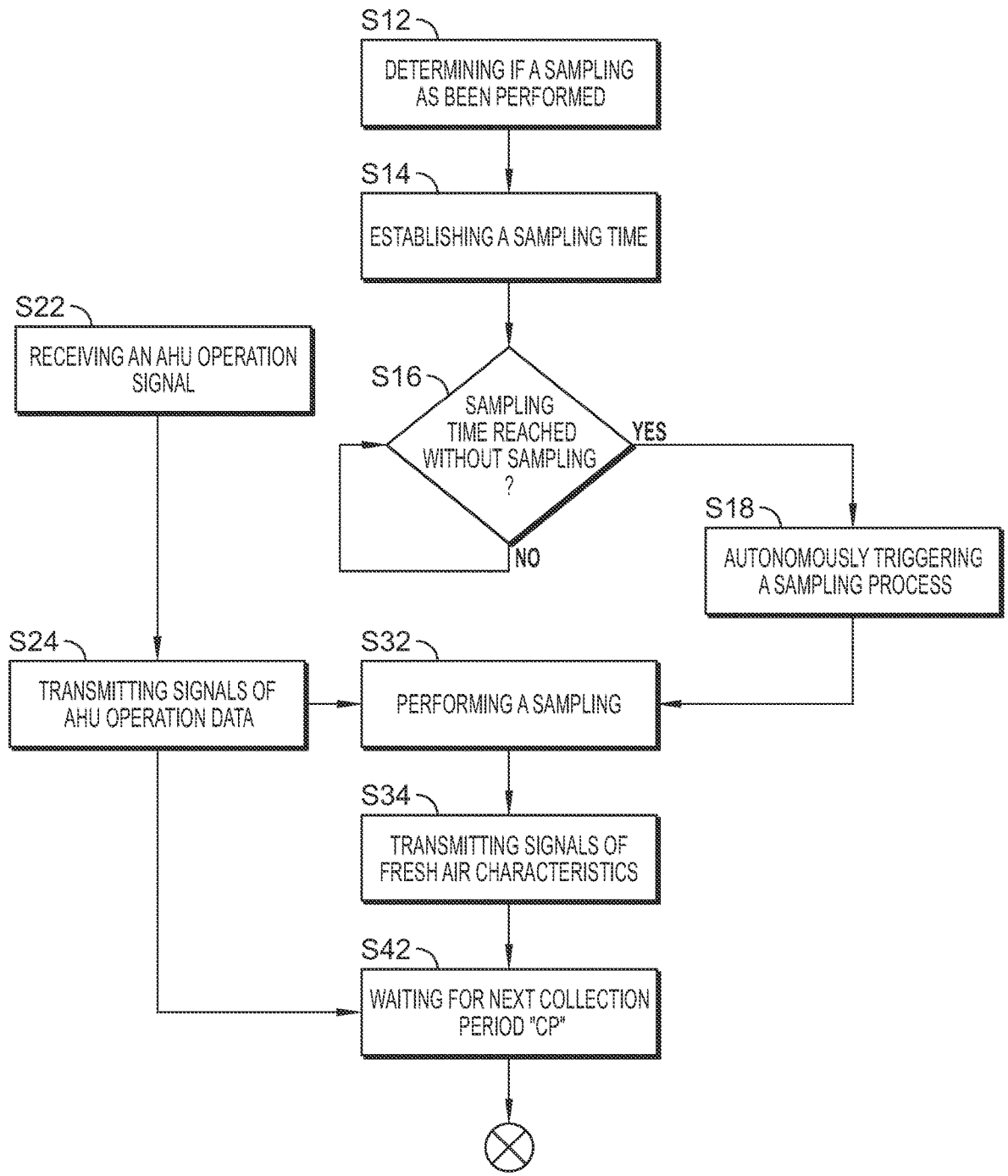
FIG. 9 is a flow chart illustrating steps performed during a fresh air sampling process of the operating method.

Referring now to FIG. 9, when no sampling has been performed during the collection period and/or when likelihood of sampling being triggered during the remaining portion of the collection period is below a certain threshold, the controller 120 triggers a sampling mode. Triggered sampling may refer to sampling performed during normal operation when fresh air is being drawn into the supply fan unit 20. Sampling comprises moving the damper 52 to an open position and powering up the fan 42 during a regulated period (e.g., 5 minutes) so that the air in the supply fan unit 20 is fresh air that relatively un-influenced by air conditions within the building interior. Further, sampling includes collecting signals from the temperature sensor 34 and the humidity sensor 36 and transmitting the signals to the prediction table 130 for registry and storage therein. Triggered sampling follows the same operation as autonomous sampling other than that the sampling operation is triggered by AHU operation instead of autonomously during normal operation.

The steps of the flow chart include determining if a sampling has been performed (S12) during a current collection period (CP), establishing a sampling time (S14), receiving an AHU operation signal (S22), performing the sampling (S32), and transmitting signals to the prediction table 130. The transmitting step involves communicating AHU operation data to the prediction table (S24) and transmitting signals of fresh air characteristics to the prediction table (S34). After these steps, a next step includes waiting for a next collection period (CP) to be initiated (S42). The flow chart further comprises establishing whether the sampling time as been reached without any sampling being performed (S16) and autonomously triggering a sampling process (S18), as applicable. The autonomously triggering a sampling process step (S18) is followed by steps (S34) and (S42).

Further, based on the present use of the prediction table(s) and in response to the AHU control signals, the present supply fan unit 20 is capable of improving the time and condition of use to prevent, for example, i) drawing high-humidity fresh air into building without the high-humidity fresh air being process by the AHU 160 operating in a cooling mode, and ii) optimizing concurrent operation of the AHU 160 and the supply fan unit 20. Accordingly, better control of operational conditions may be attained, as the characteristics of the fresh air inflow supplied into the building are monitored and/or controlled.

Figure 10:
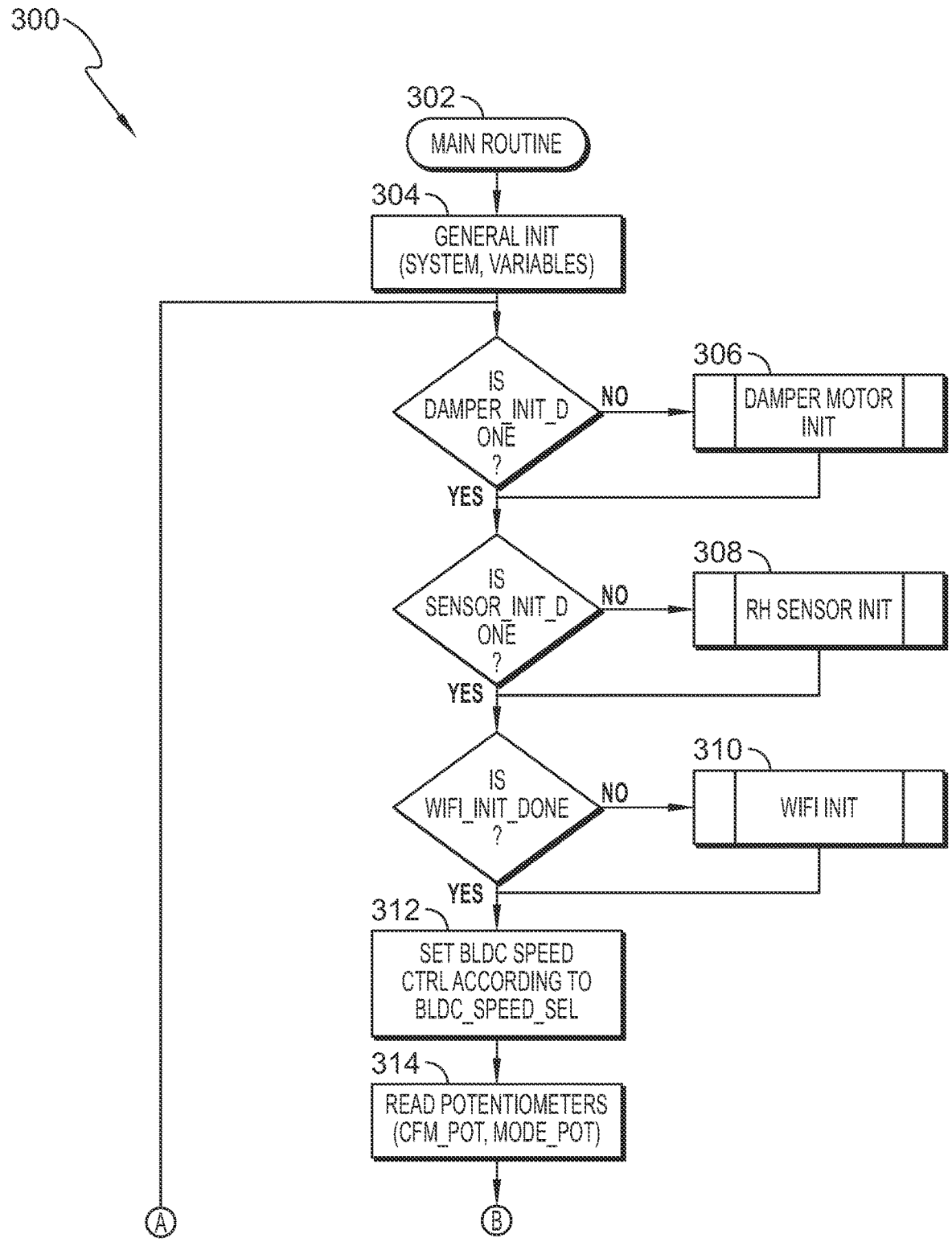
FIG. 10 is a flowchart illustrating an operating process of the supply fan unit.
Figure 10:
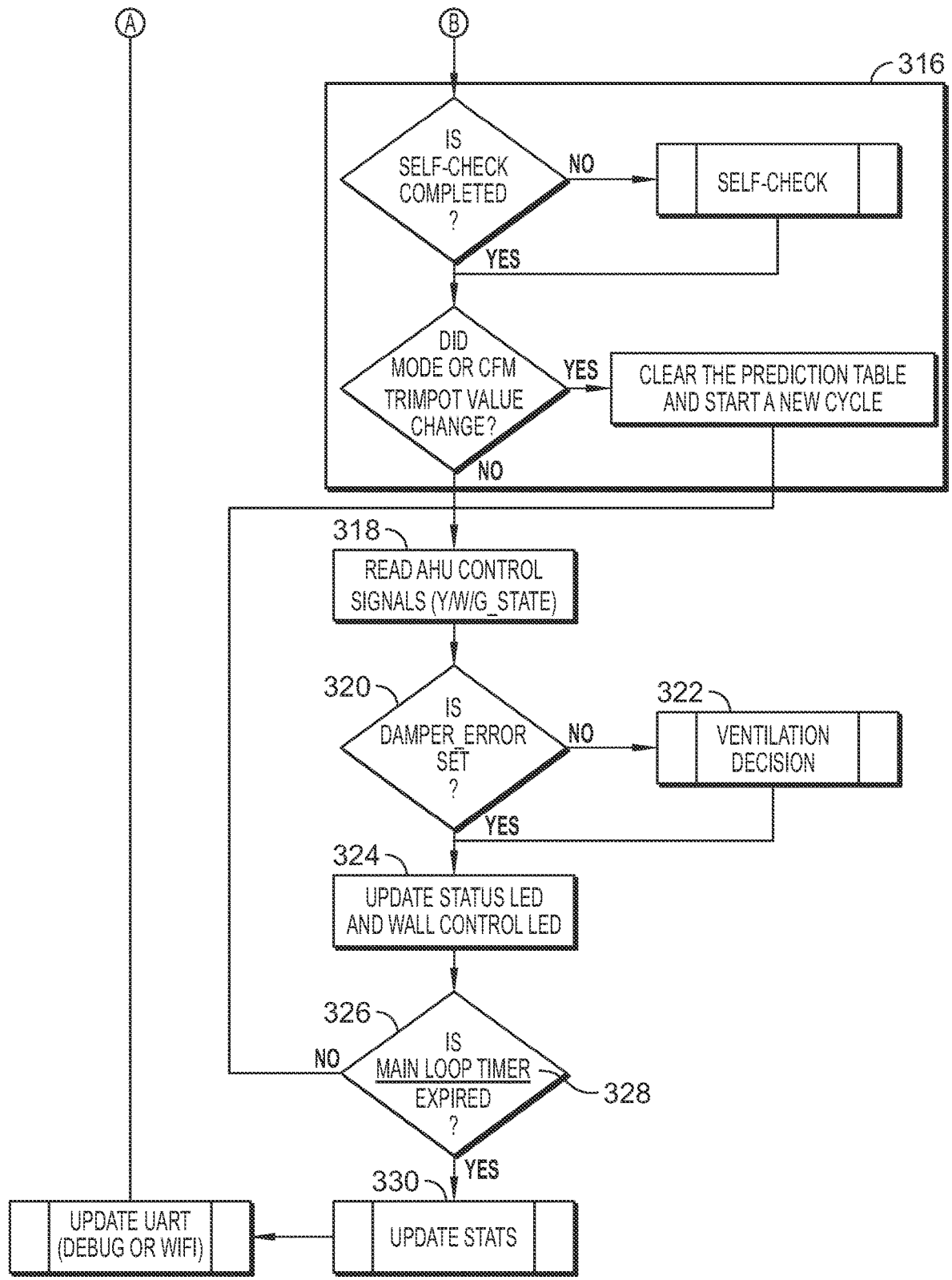

Referring now to FIG. 10, a main operating process 300 is illustrated by a flowchart beginning with a main routine step 302. At step 304, an operating system and control variables are initialized. This includes a damper motor initialization step 306, a humidity sensor initialization step 308, and a wireless communication module (e.g. Wi-Fi) initialization step 310. In a next step 312 a speed setting for the fan 42 (see FIG. 4B) is determined and set according to the configuration table 100b. Settings are read from the potentiometers 74 (see FIG. 3A) at step 314. Next, a self-check may be performed and the prediction table data 130 is cleared, if same is currently stored within the memory module 146.

At step 318, AHU control signals are accepted as inputs (see FIG. 7). Following receipt of the AHU control signals, the damper 52 is checked for an error state at step 320 while a ventilation decision process 322 is performed to determine the current ventilation schedule based on the earlier initialized variables and the prediction table data 130. In steps 324, 326 status LEDs in a user display are updated and the main operation process 300 is tracked by a main loop timer 328. While the main loop timer 328 is unexpired, the main operating process 300 continues to poll for AHU control signals at step 318. Once the main loop timer 328 expires, the main operating process 300 updates the prediction table data 130 and other variables through a variable/counter data update process 330.

Figure 11:
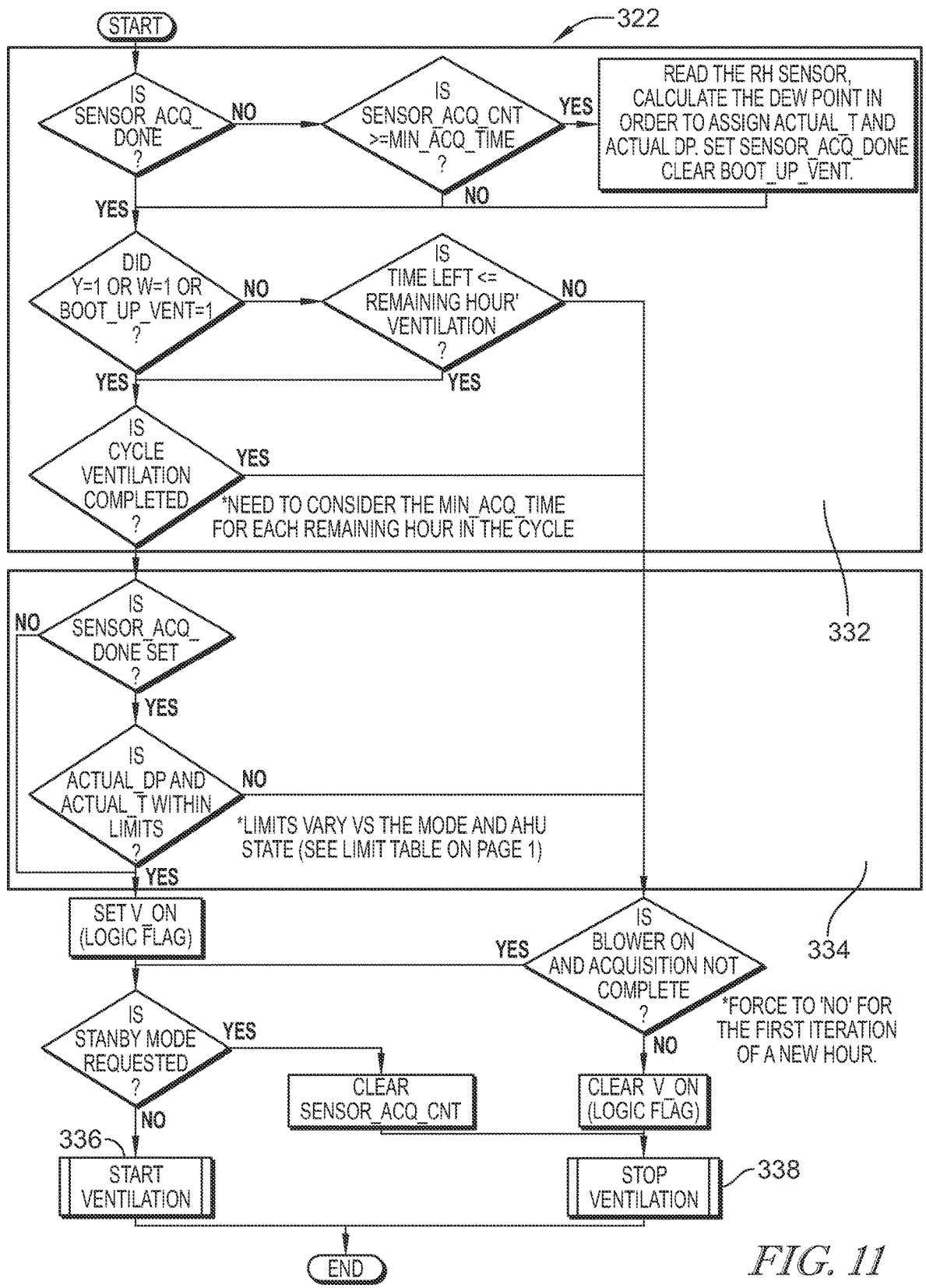
FIG. 11 is a flowchart illustrating a ventilation decision process of the operating method of the supply fan unit.

The ventilation decision process 322 is illustrated by a flowchart in FIG. 11. At step 332, the controller 120 checks whether values from the sensors 34, 36 have been acquired and whether ventilation is complete for a current ventilation cycle time 420 (see FIG. 4D) or operation cycle in FIG. 8. If sensor values have not yet been acquired, then dew point and temperature values are read from the humidity and temperature sensors 34, 36 and compared against the dew point and temperature limits of the configuration table(s) 100 (see FIGS. 4A, 4C, and 4D) at step 334. The control system 400 monitors ventilation timing and may perform sensor readings only after five minutes of continuous ventilation has been completed. This may provide more consistently accurate and reliable sensor readings because it ensures that the sensors 34, 36 measure the qualities of incoming air. In example embodiments where the sensor are disposed remote from the supply fan unit 20, such as exterior the serviced building or structure, a different protocol for reading the sensors may be implemented. For example, sensor readings may be taken over a period of time (e.g. five minutes) and averaged to reach value for use by the control system 400. If the temperature and humidity values acquired from the sensors 34, 36 are within the limits defined by the configuration table 100, then ventilation is conducted at step 336. However, if the ventilation cycle is complete or the sensor readings are not within the limits defined by the configuration table 100, then ventilation is stopped at step 338.

Figure 12:
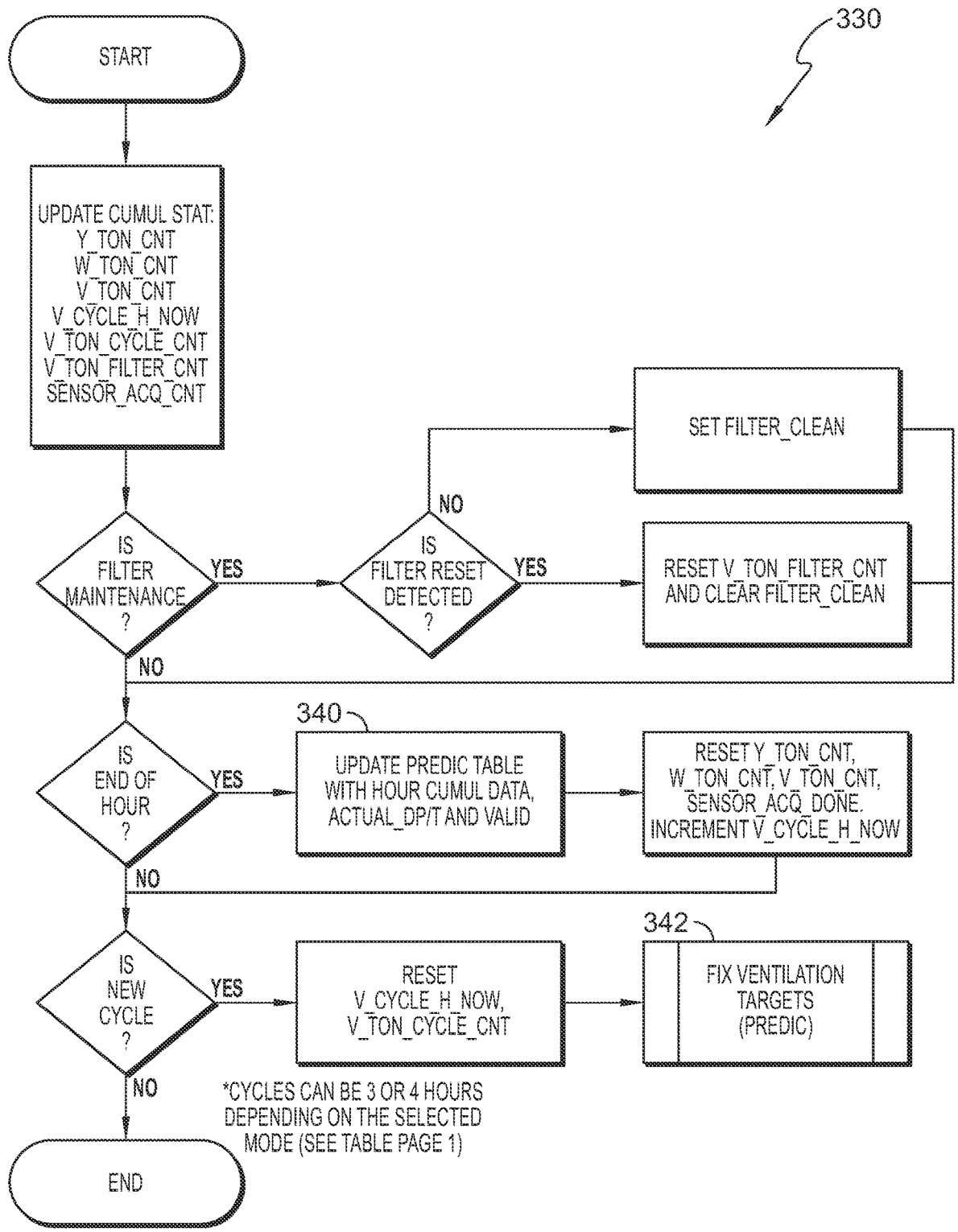
FIG. 12 is a flowchart illustrating an updating process for a prediction table, such as is shown in FIG. 3C, of the operating method.

The variable/counter data update process 330 is illustrated by the flowchart of FIG. 12. According to this flowchart, values of the counters and other variables that track operation of the supply fan unit 20 are updated. The variable/counter data update process 330 takes place upon expiration of the main loop timer 328, as shown in FIG. 10. At intermediate step 340 of the variable/counter data update process 330, the prediction table data 130 is updated near the end of each hour that the supply fan unit 20 is operated. At ventilation target prediction process 342, ventilation targets are updated according to the prediction table data 130, if a new ventilation cycle has been initiated.

Figure 13:
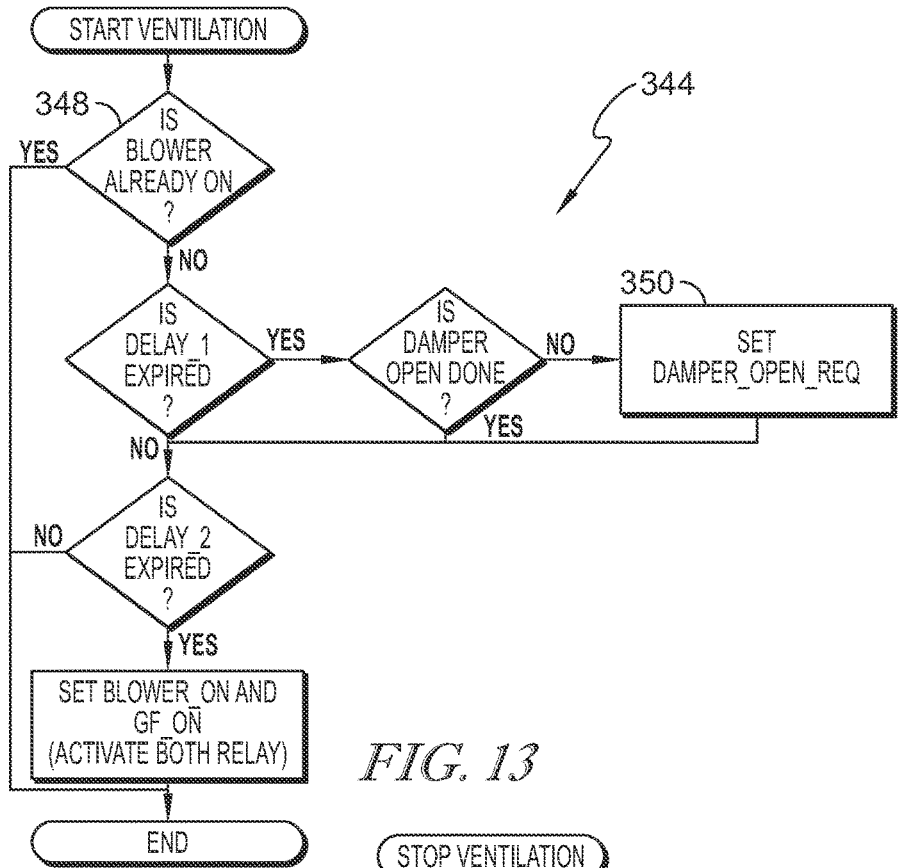
FIG. 13 is a flowchart illustrating a process for starting ventilation with the supply fan unit.
Figure 14:
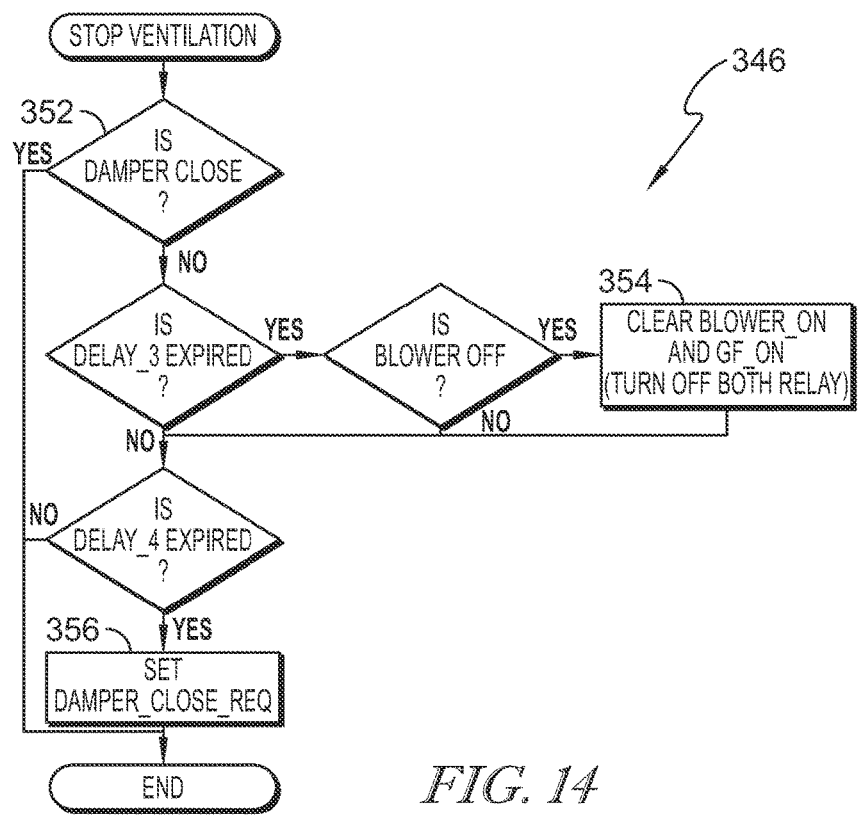
FIG. 14 is a flowchart illustrating a process for stopping ventilation with the supply fan unit.

FIGS. 13 and 14, respectively, depict with flowcharts a start ventilation process 344 and a stop ventilation process 346. During the start ventilation process 344 of FIG. 13, at step 348 the controller 120 checks an operational state of the fan 42. If the fan 42 is already operating then ventilation is in progress and the process ends. However, if the fan 42 is off, then the damper 52 is opened at step 350 before the fan 42 is activated.

The stop ventilation process 346, at step 352, checks whether the damper 52 is closed. If the damper is currently closed, then ventilation is not occurring and the stop ventilation process 346 ends. However, if the damper 52 is open, then the fan 42 is turned off at step 354 and the damper is closed at step 356.

Figure 15:
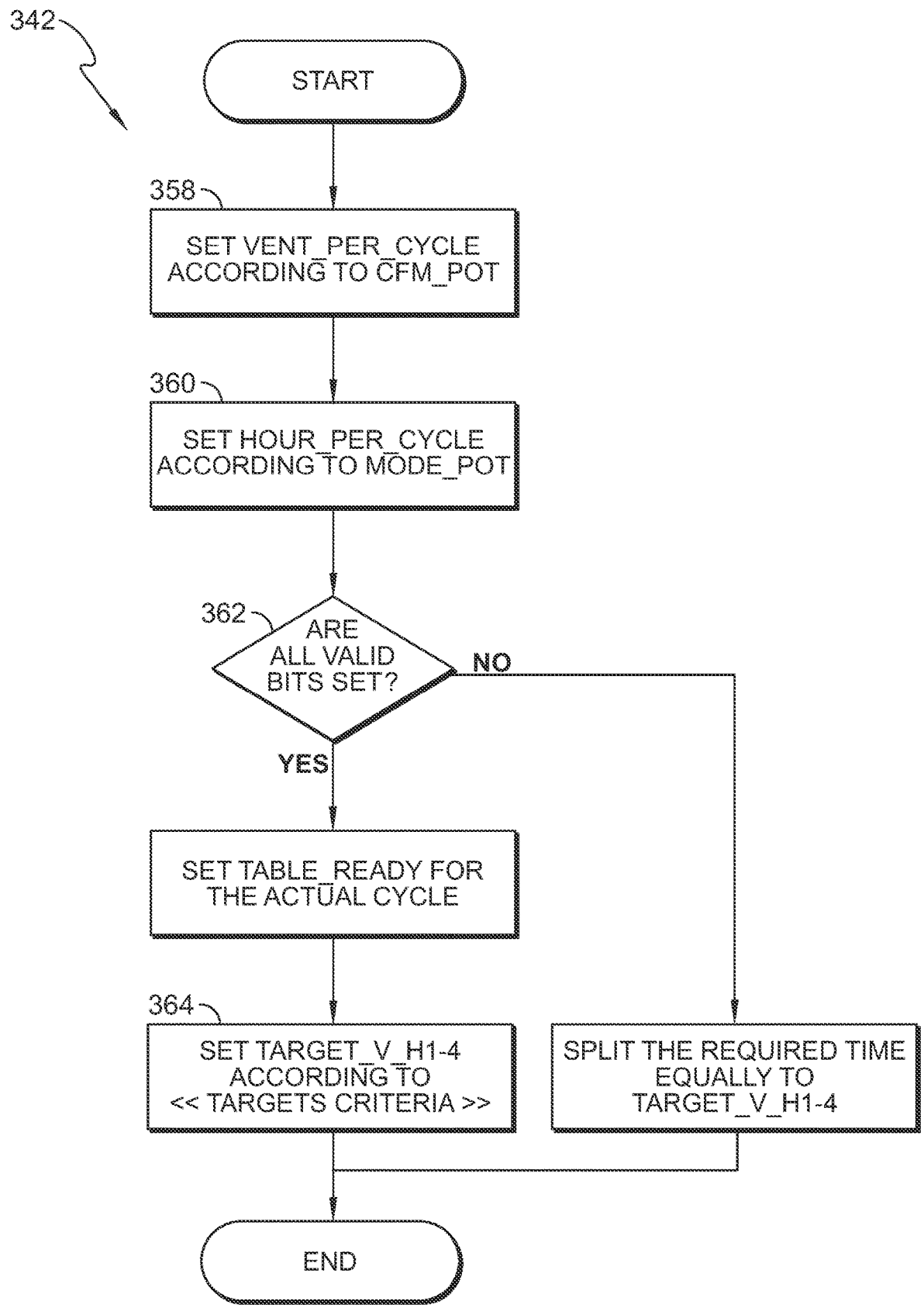
FIG. 15 is a flowchart illustrating a ventilation target prediction process for the supply fan unit.

Steps of the ventilation target prediction process 342 are shown in FIG. 15. At steps 358 and 360, control signals from the potentiometers 74 (see FIG. 3A) are polled. In response to these control signals, at step 362, the prediction table data 130 is checked. If all prediction table data 130 is valid, then ventilation targets for time and duration of ventilation are set in accordance with the prediction table data 130 at step 364. However, if the prediction table data 130 is not valid, such as when less than forty-eight hours of prediction table data 130 has been collected, then the amount of ventilation required to comply with air quality codes is scheduled equally across the length of the operation cycle time 420 (e.g., in equal time windows during each hour of the operation cycle).

INDUSTRIAL APPLICABILITY

The present supply fan unit has potentially the following advantages over current existing solutions. The supply fan unit 20 has an adjustable fan speed providing for adjustment of the ventilation rate depending on evaluation of how favorable a condition is for fresh air inflow. The supply fan unit 20 has a built-in algorithm, stored in a non-volatile memory readable by the controller 120, to optimize ventilation rate(s) when outside conditions are favorable. The supply fan unit 20 has a built-in algorithm, stored in a non-volatile memory readable by the controller 120, to potentially optimize ventilation rate(s) when inside conditions increase requirements. According to an embodiment, a pressure sensor, disposed on the outflow side of the damper 52, detects AHU operation without requiring an electrical connection to the AHU 160. The supply fan unit 20 may increase comfort by managing ventilation rate(s) according to AHU running time. The supply fan unit 20 may be interlocked with one or more exhaust fans to produce a balanced ventilation airflow.

According to an exemplary embodiment, a method controls inflow of fresh air in a home comprising an AHU performing at least one of heating, ventilating, and air conditioning of the home. The method comprises the steps of: collecting sensor signals indicative of fresh air characteristics over a sampling period, wherein the sensors are at least one of a humidity sensor and a temperature sensor, and registering the sensor signals over a cycle. The method further comprises establishing an operation profile indicative of at least one operation of inflow/intake of fresh air during an operation period, monitoring operation states of the AHU during the operation period, and performing the at least one operation(s) of inflow of fresh air based on the established operation profile as well as on the monitored operation states of the AHU. Further, according to this method, the sampling period is smaller than the operation period, and the operation period is smaller than the cycle.

According to embodiments, as discussed hereinthroughout, the length of the sampling period, i.e., collection period (CP), the length of the operation period (OP), and the length of a cycle (nD) may vary. Further, the length of the collection period (CP) may be about one hour, leaving time for readings of the integrated sensors to reach a stabilized condition before registering/storing the respective readings. Still further, the length of the collection period (CP) may be smaller. Additionally, in exemplary embodiments, the length of the collection period (CP) may be in real time or near-real time, based on the nature and location of the sensors. According to an example embodiment, the length of the operation period (OP) may be about 3 or 4 hours so as to comply with existing building regulations. Further, the length of the operation period (OP) may be an integer multiple of the length of the collection period (CP).

According to an exemplary embodiment, monitoring operation states of the AHU during the operation period is performed in real time or near-real time. The real time and/or near-real time monitoring may further comprise registering/storage of the operation states. Further, the length of the cycle (nD) may be an integer multiple of the length of a day. According to exemplary embodiments, the length of a cycle is 2 or 3 days. According to an embodiment, the method further comprises controlling a controllable inflow means operable to provide an inflow of fresh air. Also according to embodiments, the controllable inflow means is controllable by at least one of inflow operation duration and inflow rate of fresh air during inflow operation. The method may also/alternatively estimate and store data regarding the environment including, but not limited to, the current hour, the current season, etc., which may be used by the algorithm to optimize the decision-making process.

While preferred embodiments have been described above and illustrated in the accompanying drawings, it will be evident to those skilled in the art that modifications may be made without departing from this disclosure. Such modifications are considered as possible variants comprised in the scope of the disclosure.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The use of the terms "a" and "an" and "the" and "said" and similar references in the context of describing the invention (especially in the context of the following claims)

are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A ventilation system for supplying a user controlled quantity of outside air into a building structure during a predetermined period of time, comprising:
    a controller configured to be operably coupled to a memory configured to store environmental data collected from at least one environmental sensor about outside air; wherein the controller is configured to generate a prediction table based on the environmental data;
    wherein the controller is configured to predict when during the predetermined period of time to supply the user controlled quantity of outside air into the building structure, and
    the controller is further configured to provide instructions to supply the user controlled quantity of outside air to the building.

2. The ventilation system of claim 1, further comprising at least one environment sensor.

3. The ventilation system of claim 2, further comprising a fan and the controller instructs the fan to move fresh air into the building.

4. The ventilation system of claim 3, wherein the controller further instructs the fan in response to a thermostat instruction and the thermostat instruction comprises at least one of a heating call, a cooling call, and a standby call.

5. The ventilation system of claim 1, wherein the predefined time period is two previous days.

6. The ventilation system of claim 3, wherein the fan is a supply fan that provides fresh air from an exterior environment to the ventilation system.

7. The ventilation system of claim 1, wherein the controller further operates a damper to control provision of the user controlled quantity of outside air.

8. A ventilation system for supplying a user controlled quantity of outside air into a building structure during a predetermined period of time, comprising:
    a controller operable coupled to a memory configured to store a prediction table of temperatures and dew points, wherein the prediction table is generated based on environmental data collected from at least one sensor;
    wherein the controller is configured to predict, based on predicted temperatures or dew points in the prediction table, when during the predetermined period of time to supply the user controlled quantity of outside air into the building structure;
    wherein the prediction table indicates a range of temperatures and dew points during at least one mode and each of the modes corresponds to one or more threshold defined by the prediction table.

9. The ventilation system of claim 8, wherein the controller determines operating state instructions of the system according to the mode defined by the prediction table.

10. The ventilation system of claim 9, wherein the controller determines the operating state instructions of the ventilation fan according to a temperature and humidity observed by the at least one sensor.

11. The ventilation system of claim 8, wherein the one or more threshold defined by the prediction table is modified in response to a thermostat instruction received by the controller.

12. The ventilation system of claim 8, wherein the prediction table includes data from a remote source.

13. The ventilation system of claim 12, wherein the remote data source includes one of historical weather data, one or more near real-time weather service, and data gathered by other ventilation systems.

14. The ventilation system of claim 13, wherein a communications module networks the controller with one or more other ventilation systems.

15. A method of controlling inflow of a user controlled quantity of outside air, the method comprising:
    storing air values indicative of outside air characteristics over a historical time period;
    generating a prediction table of predicted temperatures or dew points based on the stored air values;
    predicting, based on predicted temperatures or dew points in the prediction table, when during a predetermined period of time to allow inflow of the user controlled quantity of outside air;
    generating instructions to allow the inflow of the user controlled quantity of outside air.

16. The method of claim 15, collecting of the air values from one or more sensors.

17. The method of claim 15, wherein the historical time period is two days.

18. The method of claim 16, wherein the one or more sensors comprise a humidity sensor, a temperature sensor, a pressure sensor, and a flow rate sensor.

19. The method of claim 15, wherein the predicted temperatures or dew points are stored as a prediction table.

* * * * *